United States Patent
Olovsson

(10) Patent No.: US 10,582,782 B2
(45) Date of Patent: Mar. 10, 2020

(54) MONITORING AND CONTROLLING SYSTEM FOR A FOOD BAR ARRANGEMENT AND A FOOD BAR ARRANGEMENT WITH SUCH A SYSTEM

(71) Applicant: Picadeli AB, Göteborg (SE)

(72) Inventor: Sara Olovsson, Vänersborg (SE)

(73) Assignee: PICADELI AB, Gothenburg (SE)

( * ) Notice: Subject to any disclaimer, the term of this patent is extended or adjusted under 35 U.S.C. 154(b) by 154 days.

(21) Appl. No.: 15/570,059

(22) PCT Filed: Apr. 13, 2016

(86) PCT No.: PCT/SE2016/050321
§ 371 (c)(1),
(2) Date: Oct. 27, 2017

(87) PCT Pub. No.: WO2016/175696
PCT Pub. Date: Nov. 3, 2016

(65) Prior Publication Data
US 2018/0103778 A1    Apr. 19, 2018

(30) Foreign Application Priority Data

Apr. 27, 2015 (SE) ...................................... 1550502

(51) Int. Cl.
*A47F 3/04* (2006.01)
*G07F 9/02* (2006.01)
(Continued)

(52) U.S. Cl.
CPC ........... *A47F 3/0478* (2013.01); *G06Q 10/08* (2013.01); *G06Q 10/087* (2013.01);
(Continued)

(58) Field of Classification Search
CPC .. G06Q 30/0281; G06Q 10/087; G06Q 50/12; G06Q 10/08; G07F 9/10;
(Continued)

(56) References Cited

U.S. PATENT DOCUMENTS 3,982,097 A * 9/1976 Seider .................... H05B 1/023
219/486
4,074,793 A * 2/1978 Yuter ....................... E04H 3/04
186/38
(Continued)

FOREIGN PATENT DOCUMENTS

EP    1821273 A2    8/2007
FR    2 755 218     4/1998
(Continued)

OTHER PUBLICATIONS

Sweden Patent and Registration Office, Int'l Search Report in PCT/SE2016/050321, dated Aug. 3, 2016.
(Continued)

*Primary Examiner* — Andrew Joseph Rudy
(74) *Attorney, Agent, or Firm* — Jeffrey S. Melcher; Melcher Patent Law PLLC

(57) ABSTRACT

A monitoring and controlling system for product holding arrangements, food bars and the like includes functional stations holding products at different locations and a station serving unit with a server and in communication by a local network with the functional product stations that have digital displays. The station serving unit communicates with a portable unit with a display and a scanner for scanning product label codes with product information via a wireless local network, and holds information about all products held in the stations and their current locations. Information is updated through scanned product label code information and/or instructions from the portable unit and through information from the functional product holding stations. The (Continued)

portable unit contains at least part of the information in the station serving unit, and has an interactive user interface enabling handling, controlling, and monitoring at least the products via the portable unit.

21 Claims, 14 Drawing Sheets

(51) Int. Cl.

| | |
|---|---|
| *G06Q 50/12* | (2012.01) |
| *G06Q 10/08* | (2012.01) |
| *G06Q 30/02* | (2012.01) |
| *G07G 1/14* | (2006.01) |
| *G07F 9/10* | (2006.01) |
| *G07G 1/00* | (2006.01) |
| *A47F 10/06* | (2006.01) |
| *G09F 23/00* | (2006.01) |
| *G09F 27/00* | (2006.01) |
| *G09F 23/06* | (2006.01) |

(52) U.S. Cl.
CPC ......... *G06Q 30/0281* (2013.01); *G06Q 50/12* (2013.01); *G07F 9/02* (2013.01); *G07F 9/10* (2013.01); *G07G 1/0036* (2013.01); *G07G 1/14* (2013.01); *A47F 3/0404* (2013.01); *A47F 3/0486* (2013.01); *A47F 10/06* (2013.01); *G09F 23/00* (2013.01); *G09F 23/06* (2013.01); *G09F 27/00* (2013.01)

(58) Field of Classification Search
CPC . G07F 9/02; G09F 23/00; G09F 27/00; G09F 23/06; A47F 3/0404; A47F 3/0478; A47F 3/0486; A47F 10/06; G07G 1/0036; G07G 1/14
USPC ...... 62/126, 229; 705/28, 30; 186/38, 49, 50
See application file for complete search history.

(56) References Cited

U.S. PATENT DOCUMENTS

| | | | | |
|---|---|---|---|---|
| 4,547,851 A | * | 10/1985 | Kurland ............... | G06Q 10/087 186/38 |
| 4,962,466 A | * | 10/1990 | Revesz ................. | G06Q 30/02 340/5.91 |
| 5,504,589 A | * | 4/1996 | Montague ............ | G06Q 10/087 358/403 |
| 6,102,162 A | | 8/2000 | Teicher | |
| 6,959,283 B1 | * | 10/2005 | White .................... | G06Q 30/06 235/383 |
| 7,827,811 B2 | * | 11/2010 | Ferragut, II ............ | F25D 29/00 62/126 |
| 8,060,408 B2 | * | 11/2011 | Koether ................. | G06Q 10/06 705/15 |
| 9,003,820 B2 | * | 4/2015 | Veltrop ............... | A47J 36/2483 62/229 |
| 9,037,478 B2 | * | 5/2015 | Holman ................ | G06Q 50/22 705/1.1 |
| 9,257,150 B2 | * | 2/2016 | Hurst ..................... | G11B 27/34 |
| 9,412,086 B2 | * | 8/2016 | Morse .................... | F25D 29/00 |
| 9,536,236 B2 | * | 1/2017 | Hay ....................... | G06Q 20/18 |
| 9,582,977 B2 | * | 2/2017 | Cowley ................. | G08B 21/02 |
| 9,731,895 B2 | * | 8/2017 | Manning ............... | F25D 13/06 |
| 9,733,012 B2 | * | 8/2017 | Manning ................ | F25D 29/00 |
| 9,911,290 B1 | * | 3/2018 | Zalewski ............. | G07G 1/0072 |
| 10,058,198 B2 | * | 8/2018 | Atkins .................... | A47F 10/06 |
| 10,271,667 B2 | * | 4/2019 | Wallinder ............... | A47F 3/007 |
| 2007/0157637 A1 | | 7/2007 | Farragut et al. | |
| 2011/0252813 A1 | | 10/2011 | Veltrop | |
| 2012/0101876 A1 | | 4/2012 | Turvey et al. | |
| 2013/0307409 A1 | | 11/2013 | Wessel | |
| 2014/0252091 A1 | | 9/2014 | Morse et al. | |
| 2014/0366751 A1 | | 12/2014 | Atkins et al. | |
| 2017/0196375 A1 | | 7/2017 | Wallinder | |

FOREIGN PATENT DOCUMENTS

| | | |
|---|---|---|
| GB | 2 402 310 | 12/2004 |
| WO | 2008/140212 A1 | 11/2008 |

OTHER PUBLICATIONS

Office Action issued in corresponding European Patent Application No. 16 786 850.4-1222, dated Aug. 5, 2019, pp. 1-7.
Extended EP Search Report issued in corresponding European Patent Application No. 16 786 850.4-1222, dated Aug. 5, 2019, pp. 1-12.

\* cited by examiner

MONITORING AND CONTROLLING SYSTEM FOR A FOOD BAR ARRANGEMENT AND A FOOD BAR ARRANGEMENT WITH SUCH A SYSTEM

TECHNICAL FIELD

The present invention relates to a monitoring and controlling system for a product holding arrangement comprising a food bar arrangement having the features of the first part of claim 1, and to a food bar arrangement with such a system having the features of the first part of claim 18.

BACKGROUND

In recent times it has become more and more popular to offer fresh food, salads, fruit, vegetables, chicken, but also cooked and prepared food, healthy food etc. from a food bar or a salad bar, where the customer can pick and compose a meal from a number of different products kept in canteens or pans. Since the food products may remain for some time in the pans, which may be accessed by quite a large number of persons, the requirements as to an appropriate and hygienic storing capability are high. The food products also have to be kept under such conditions, and at such a temperature, that bacterial growth is prevented and the products can be kept fresh, appetizing and are not ruined or deteriorated in any way due to the storing.

To be able to maintain an accurate temperature, e.g. above 0° (to avoid that the products be frozen), but below 8° C., or within more strictly specified temperature limits, several different arrangements have been proposed.

Different types of cooling arrangements are therefor used, the functioning of which is extremely important for the provisioning of an even temperature distribution in the food stored in the pans and an accurate cooling of the products in the pans or canteens, and even independently of the location of the food and of the pans in the food bar arrangement. Covering arrangements are used to cover and protect the pans with content. They are frequently opened by customers accessing the food, each time during a shorter or a longer time period, which makes it even more difficult to obtain and maintain an even and accurate temperature distribution throughout the food bar. When covering arrangements, doors or lids, are opened to provide access to the food products, air of a higher temperature will enter, which means that even more cooling is required. If fans are used, the products will be even more exposed to cool air, and the drying effect will be further increased, which means that the time period that the products can be stored in the food bar will be even shorter. In addition thereto, when the covering arrangements are opened, this will contribute to an even more uneven temperature distribution.

These factors affect the time period that the products can be kept in the pans, and they may have to be disposed of, even if they actually could have been stored for a longer time period, if stored under appropriate conditions.

Still further, the whole chain involved in delivering food, loading the canteens or pans, replacing food products, storing food products in the meanwhile, when pans are likely to soon being emptied, the different shelf times of different products, the varying consumption of different products, all are factors that involve a certain problematic as far as intermediate storing, replacement, refilling of pans, in general the logistics, etc. are concerned.

Products are often to be fetched from a refrigerating facility located distant from the food bar, which means that it is difficult to serve the customers, end users, in an optimal manner and timing is difficult if one or more pans are run out of content. It is time consuming as well as laborious for staff to all the time keep up to date information concerning the content, e.g. the filling degree in the pans, and to, at the appropriate moment in time, fetch products from an intermediate storage, involving carrying the pans or the products around in the store, which also may affect the temperature of the products, and the hygienic standards. It is an even more challenging task to order food products from a supplier in a manner such that what is offered in the food bar is in agreement with end user demands and meet high quality standards. Several technical as well as logistical problems are involved, both for service provider, different suppliers of different products having to deliver to several users (stores or similar) holding one or more food bars and the involved staff. It is extremely difficult for service provider, supplier and end user to assure that all requirements as to hygiene, quality, end user demand and availability are met. To keep control of all products in a food bar arrangement in a store is extremely difficult.

For a service provider it is almost an impossible task to keep control of each product in each food bar, in each pan or canteen, also varying with time of the year, time of the day, climate variations, end user category and "shelf" time, i.e. time that the products can be kept in a food bar, the functioning of the cooling arrangements, how often the products are accessed etc. for all different products. With today known food bars, a lot of manual control and inspection is required, and there is most likely to still be a risk that products are not offered in a desired composition, that too large amounts are provided of some products, to scarce amounts of others, that unnecessary waste of food results. It is also demanding a lot of staff to assure an accurate functioning, accurate conditions and accurate product offering in time. It is extremely laborious to have all requirements verified all time and to perform routine quality controls of all products requiring immense carefulness and reporting accuracy and correctness.

SUMMARY

It is therefore an object of the present invention to provide a monitoring and controlling system for a number of product holding arrangements comprising food bar arrangements for holding fresh products, as initially referred to, through which one or more of the above mentioned problems can be solved. It is also an object of the invention to provide a food bar arrangement with such a monitoring and controlling system through which one or more of the above mentioned problems can be overcome.

It is a particular object to provide a monitoring and controlling system which enables monitoring and control of the contents and products in a food bar arrangement holding fresh products substantially in real-time.

It is also an object of the invention to provide a monitoring and control system through which information about products in a food bar easily can be provided to the staff of a user, and particularly also to suppliers and/or the service provider, e.g. Picadeli™.

Still another object is to provide a monitoring and controlling system through which monitoring and supervision of the functioning of a number of bar arrangements is facilitated, and is allowed to be carried out in real-time.

Still another particular object of the invention is to provide a monitoring and controlling system which facilitates the handling of products in a number of food bar arrangements.

Further yet it is a particular object of the invention to provide a monitoring and controlling system for a food bar which facilitates the supply of products in an accurate, appropriate and up-to date manner based on reliable data.

Yet another particular object is to provide a monitoring and controlling system through which information to end users or consumers, i.e. buyers of the products in a food bar, easily can be provided.

In general it is also an object of the invention to provide a monitoring and controlling system for a plurality of food bar arrangements which is capable of providing easy access to up to date information to different concerned groups or individuals, service providers, suppliers, users (stores) as well as, even more particularly, to end users.

It is a particular object to enable fulfillment of high requirements as to hygiene, freshness of products etc. in an easy manner.

Still further it is a particular object to provide a monitoring and controlling system which is easy to install, implement and use.

Most particularly it is an object to provide a monitoring and controlling system through which the handling of a food bar, the food product handling and storing as well as equipment handling, cooling system, fans, etc. but also maintenance, can be facilitated and optimized for all involved categories and which saves staff and products.

It is a particular object to provide a monitoring and controlling system for a food bar, particularly of the type intended for self-service, but also for other purposes, e.g. in canteens in schools or restaurants or imbiss stands when staff are serving the customers.

Therefore a monitoring and controlling system as initially referred to is provided which has the characterizing features of claim 1.

A food bar arrangement with such a system is therefore also provided which has the characterizing features of claim 18.

Advantageous embodiments are given by the appended dependent claims.

BRIEF DESCRIPTION OF THE DRAWINGS

The invention will in the following be further described, in a non-limiting manner, and with reference to the accompanying drawings, in which.

DETAILED DESCRIPTION

Figure 1:
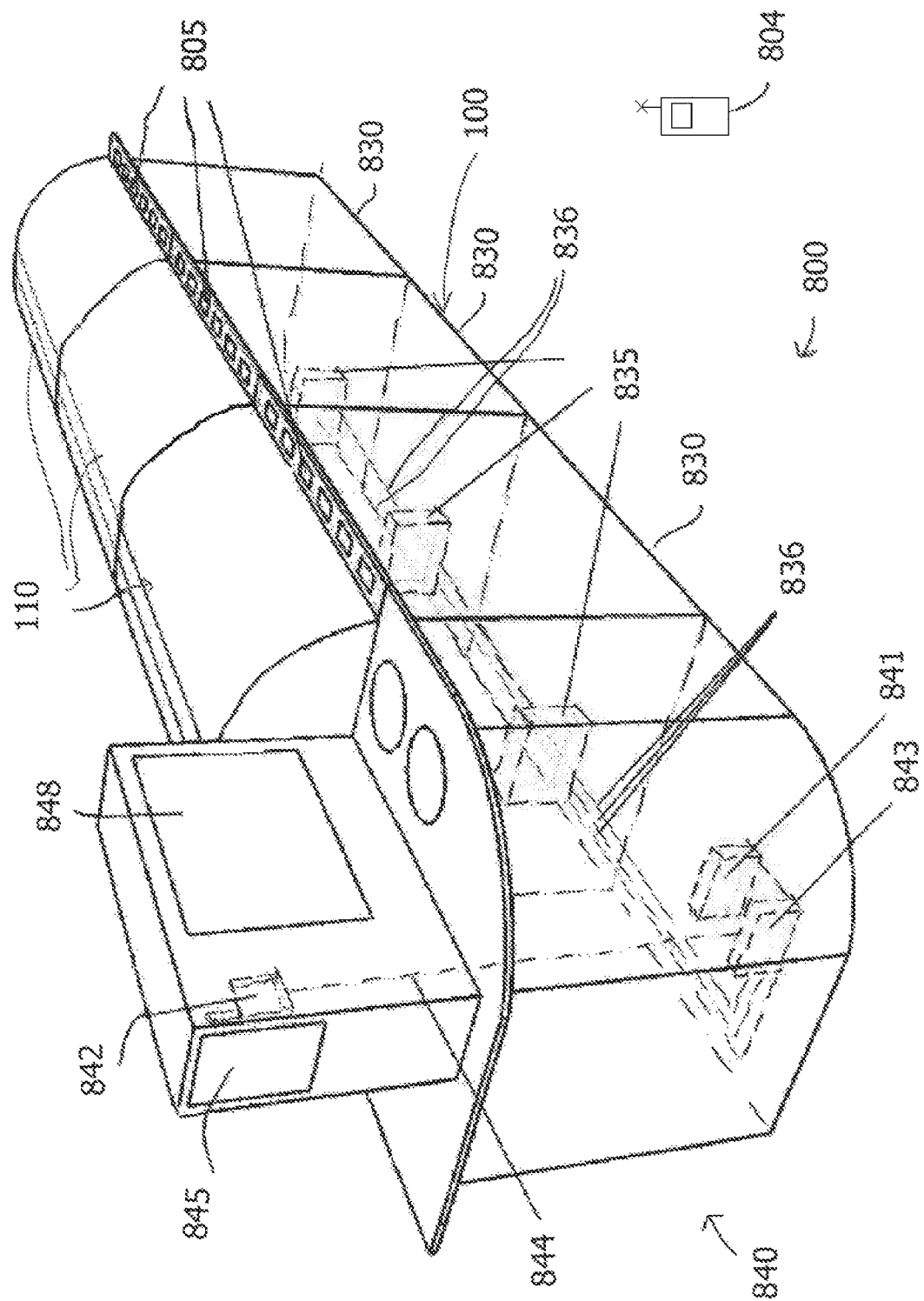
FIG. 1 is a schematic view in perspective of an exemplary food bar arrangement with a monitoring and controlling system according to one embodiment of the invention.

FIG. 1 shows a monitoring and controlling system 800 provided in a food bar arrangement 100. The exemplary food bar arrangement 100 with the monitoring and controlling system 800 will be more thoroughly described with reference to advantageous embodiments in FIGS. 9-14 below, to which the invention however is not limited. The food bar arrangement 100 in this particular case, to which the inventive concept is by means not limited, comprises openable/closable covering arrangements 110 adapted to cover canteens or pans (not shown; see FIG. 9) arranged in a holding arrangement (see FIG. 9) of the food bar arrangement comprising a number of cabinets or (fresh) cooling units (also called cupboard or bench arrangements), in the following also simply referred to as FCUs, 830 provided with tray slides 16 on which digital displaying means, in the following denoted labels, 805 are disposed. It should be clear, that for reasons of clarity the digital labels are over-dimensioned with respect to the size of the tray slides 16 in FIG. 1. The food bar arrangement 100 does not have to comprise a covering arrangement 110 as shown in FIG. 1, and as discussed in the Swedish patent application 1450649-7 filed on May 29, 2014 by the same applicant. Other covering arrangements may also be used, as well as other food bar arrangements in general.

It should also be clear that a covering arrangement 110 does not have to comprise two covering elements for a dual sided food bar, but there may be one covering element for a dual-sided food bar, or the bar may be a single-sided food bar or a food bar with more sides etc. A food bar arrangement may comprise any number of FCUs 830, from 1 up to five or more.

The food bar arrangement 100 comprises one or more holding arrangements in which a plurality of, particularly disposable or one-way, pans are to be disposed, in pan holders (not shown in FIG. 1). It further here comprises a cooling system with a refrigerating arrangement. The cooling system comprises a cooling arrangement for cooling the pans, and hence the food products provided therein for keeping them at a desired temperature, e.g. above 0° but below 8° C., or within a more specified temperature interval.

The cooling system in a particular embodiment is adapted to cool, and allow for separate controlling of the cooling of at least two different climate zones, or so that at least two different climate zones are provided.

The covering elements are adapted to cover the pans from above so that the content is protected in time periods between customers accessing the content etc.

The covering arrangement 110 comprises covering elements which can be transferred from an open position or an open state, in which access to the content in the pans is provided, to a closed state.

At respective rear sides of the covering elements, and between them, in an advantageous embodiment a cooling arrangement 200, a cooling tower, is disposed.

The monitoring and controlling arrangement 800 in FIG. 1 comprises two functional product stations, in the following also simply denoted FCUs, 830 disposed in functional product holding stations, each e.g. comprising one or more cabinets 300 provided with doors, and which, in addition to a machine room, comprise a refrigerating arrangement, e.g. comprising two refrigerators, forming a second climate zone, and/or, optionally, a thawing unit, forming a fourth climate zone.

The food bar arrangement 100 comprises a number of FCUs, arranged in or comprising cooling modules or units, 830 and a station serving unit 840, also denoted an accessory, AU, unit, in the following also simply referred to as an AU. The station serving unit may comprise or be arranged in or in association with a food bar arrangement service station 710 for accessories such as bowels or packages for food products, cutlery, towels, ketchup, mustard, dressings, spices etc. It further comprises a station serving unit server 841 for communication with a central server of the monitoring and controlling system 800 over dedicated Application Programming Interfaces (APIs) (cf. FIG. 3), a first display 845 comprising a product display, preferably a touch screen allowing end users to obtain detailed information e.g. about currently available products in the food bar, content, allergens, nutritive values etc. The product display 845 in an advantageous embodiment also displays current temperatures in all FCUs 830. The product display 845 communicates with the accessory unit server and communication means 841 via a wireless local network, Wi-Fi. In an advantageous embodiment the accessory unit AU 840 also comprises a second display 848 for additional information, advertising etc. In one embodiment it comprises an Android stick which is in communication via an HDMI port via a router 842 with the Internet, e.g. with an external Signagesolution.

The AU 840 also comprises a wireless router 842 for external Internet connection, and internal connection with the product display 845, optionally an advertising display 848 (TV), and a portable unit 804.

On each functional product station (FCU) 830 a plurality of digital labels 805 are provided, one for each pan or canteen. The digital labels 805 are preferably provided on the tray slides 16 of the food bar arrangement, although they may also be provided elsewhere, if the monitoring and controlling system 800 is used with another type of food bar arrangement, the main thing being that each digital label 805 is located such that it can unambiguously be associated with a corresponding canteen, pan or similar. The digital label 805 in preferable embodiments comprise 4,3"-displays with 24 bits colour depth and a resolution of 480×272 pixels for showing each label. Of course this merely relates to one particular embodiment and other parameter values can of course be selected. The displays are preferably mounted on a dedicated circuit board.

The portable unit 804 comprises a portable computer, a laptop, a palmtop, an iPod, e.g. an iPod touch, an iPad or any other appropriate portable computing device with a scanning functionality, or connected to a scanner. The portable unit 804 is intended to be used by a user, e.g. staff of a store or similar in which the food bar arrangement is arranged. It is adapted to be used for handling food products and their safe and accurate storing and keeping in the food bar arrangement, and is wirelessly connected to the accessory unit 840. Some functions of the portable unit 804 may comprise or be involved in the controlling for refilling of products, e.g. disposable or one-way pans, by scanning a product code, e.g. a QR code, provided on a product label on the one-way pan. It can also be used if a canteen or pan does not contain a label with a product code as will be more thoroughly explained with reference to FIG. 7. It is also used for controlling the shelf life, (current) expiration date of the product in the pans, or remaining time until expiry, reminders concerning products for which the best before date has passed, alarms concerning the functioning of cooling etc. of the food bar arrangement, opening arrangements, fan temperatures etc., quality and safety rounds, and reminders when such are to be performed, statistics and other information valuable in the handling of a food bar and fresh food. It can also be used for setting appropriate operation state, e.g. normal operating state, cleaning state, night operation state, fault proof operation state etc., if such options are available. The portable unit 804 is in wireless communication with the accessory unit server 841, e.g. via Wi-Fi.

The station serving unit AU 840 further comprises a station serving unit switch 843 for interconnection of the wireless router 842, the computer of the accessory unit 841, e.g. a Raspberry Pi computer, and the cooling units or modules (FCUs) 830, preferably via a TCP/IP cable (Transmission Control Protocol/Internet Protocol 844.

Advantageously the entire system works without Internet connection during limited time periods, and synchronization of data takes place when Internet connection is available.

Each FCU 830 comprises an electrical unit 835 in communication with the AU switch 843 via cables 836. It comprises means with a control unit 580 (see FIG. 10) for controlling and monitoring the cooling, temperatures, the opening arrangements, fans, doors etc. as will be further discussed with reference to an advantageous embodiment in FIG. 10.

The hardware of the electrical unit 835 in one embodiment comprises a dedicated circuit board and a computer, e.g. Raspberry Pi appropriately specified. The electrical unit 835 advantageously comprises software for handling the controlling of the cooling system, temperature monitoring by means of temperature sensors, fans, the compressor defrosting, doors and cover elements of the covering arrangement 110. Preferably software is also provided for handling image printing on the displays 845 for the digital labels 805.

Figure 2:
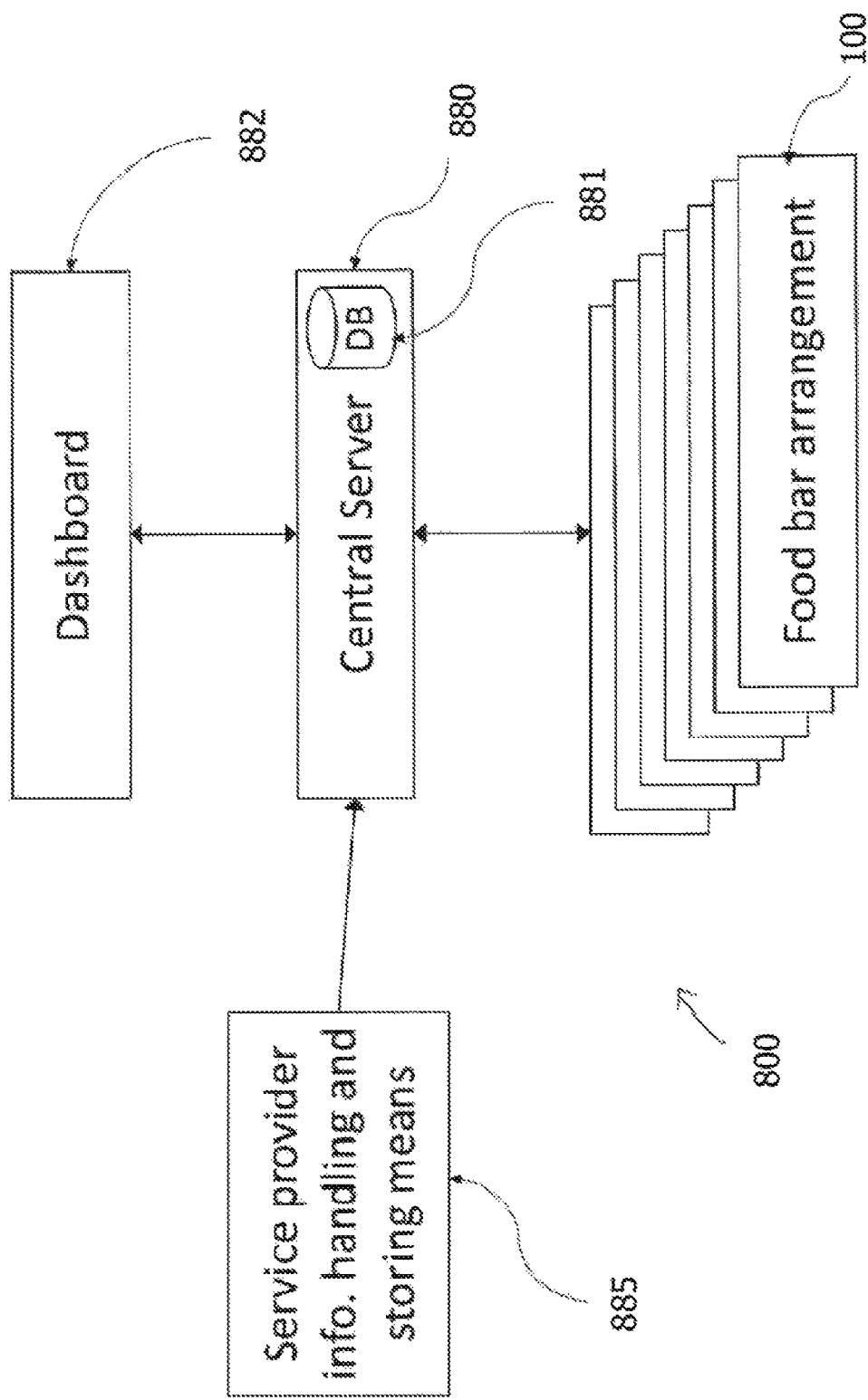
FIG. 2 is a schematic block diagram of the monitoring and controlling system according to the invention.

FIG. 2 illustrates a number of food bar arrangements each including the entities of the monitoring and controlling system 800 as described with reference to FIG. 1 further comprising, or being in communication with a central server 880 comprising a number of databases 881, located at the service provider premises or elsewhere, and holding information about all products in all food bar arrangements 100, current up to date information and information data history, information about the food bar arrangements, up to date and historical, alarm information etc. It is in communication with the service provider information handling and storing means 885, holding information about clients (users, e.g. stores holding one or more food bar arrangements 100), suppliers of food products, data etc. forming part of the service provider business system. Preferably also a so called dashboard 882 is provided comprising a web portal to which can be logged in and access to relevant information be provided depending on user access criteria, which are different e.g. for the service provider and users or clients. The dashboard particularly comprises a monitoring function for monitoring and controlling purposes of functioning of the entities of the food bar arrangements, cooling system, covering arrangements, fans etc., alarms, measures taken in case of alarms, event reports, temperatures from sensors of the cooling system, and due dates or times for different rounds, completion of rounds etc. Particularly it comprises a reporting tool, wherein different roles are created upon creation of a new user of the reporting tool wherein e.g. the service provider administrator has access to all data, a responsible person of a store only to the data concerning the food bar arrangement and the monitoring or controlling system of the store and concerned products, and someone responsible for a trademark has access to data of all stores marketing the trademark to mention some non-limiting examples. As an example, the service provider can, when logging in, see data represented and displayed in any desired manner concerning all stores having a food bar with a monitoring and controlling system, such as the number of cooling units, the number currently in operation, or when or for how long they have been in operation or under service, sensed temperatures, prices, which products they contain, refillings with amounts, dates and frequency, planogram fulfillment, products in a food bar, products for which the best before date has expired, expiration dates, logs of quality rounds, e.g. monthly, weekly, daily rounds, delayed quality rounds, current planograms and relevant key figures. It should be clear that the above indicated data or information merely are examples; more or less data can be available according to different embodiments, in some cases also depending on different implementations of the monitoring and controlling system in different stores, i.e. more or less advanced e.g. depending the size or capacity of the food bar arrangement holder.

The monitoring and alarm function displayed via the dashboard 882 provides a means for remote monitoring and control of the operation of all food bar arrangements, e.g. in all stores. Operation data is continuously delivered for/from all cooling units or modules (FCU) 830. Information about any alarm is also automatically provided. Thus, if there is an alarm in any one of the FCUs, this can also be seen via the monitoring and alarm function. Particularly reports are provided from each FCU with a regular time interval, e.g. between 1 and 5 minutes, and for each kind of measurement data acceptable intervals are defined such that data reported not being within the given interval will generate an indication or a flag, and if no satisfactory action has been taken within a predetermined time interval, an alarm is generated.

As referred to above, data is e.g. provided concerning temperatures of environment, compressor, pan holding arrangements, refrigerators, defrosting, cooling arrangement etc. by means of temperature sensors, fans (rotation speed or number of revolutions), opening time for covering elements and doors of refrigerators.

If an alarm is generated concerning an FCU 830, all current data of the FCU is collected, temperature data, status data of cover element opening times etc., and the alarms are provided to the central server 880, for displaying on the dashboard.

An alarm is first provided to the portable unit 804 (cf. FIG. 1), and if no measures are taken within a given time period, the alarm is provided to the central server 880 for generation of an alarm on the presentation on the start page on the dashboard 882. For different alarms, different intervention levels and measures can be defined, as well as different escalation options can be provided for different types of alarms. An alarm can be silenced during the taking of counteractions, but logs are provided until the problem has been solved. An alarm can only be reset when satisfactory log data is generated.

Further so called food alarms can be provided from the service provider via the dashboard web portal 882 via the central server 880 to one or more stores, to the respective portable units 804, or as e-mails or as SMSs (on condition that an SMS gateway is provided). Such alarms may e.g. concern a certain product, a trademark or specific batches, as far as information on batch is available. Batch numbers marked with a food alarm will be recognized when scanned with a portable unit.

Figure 3:
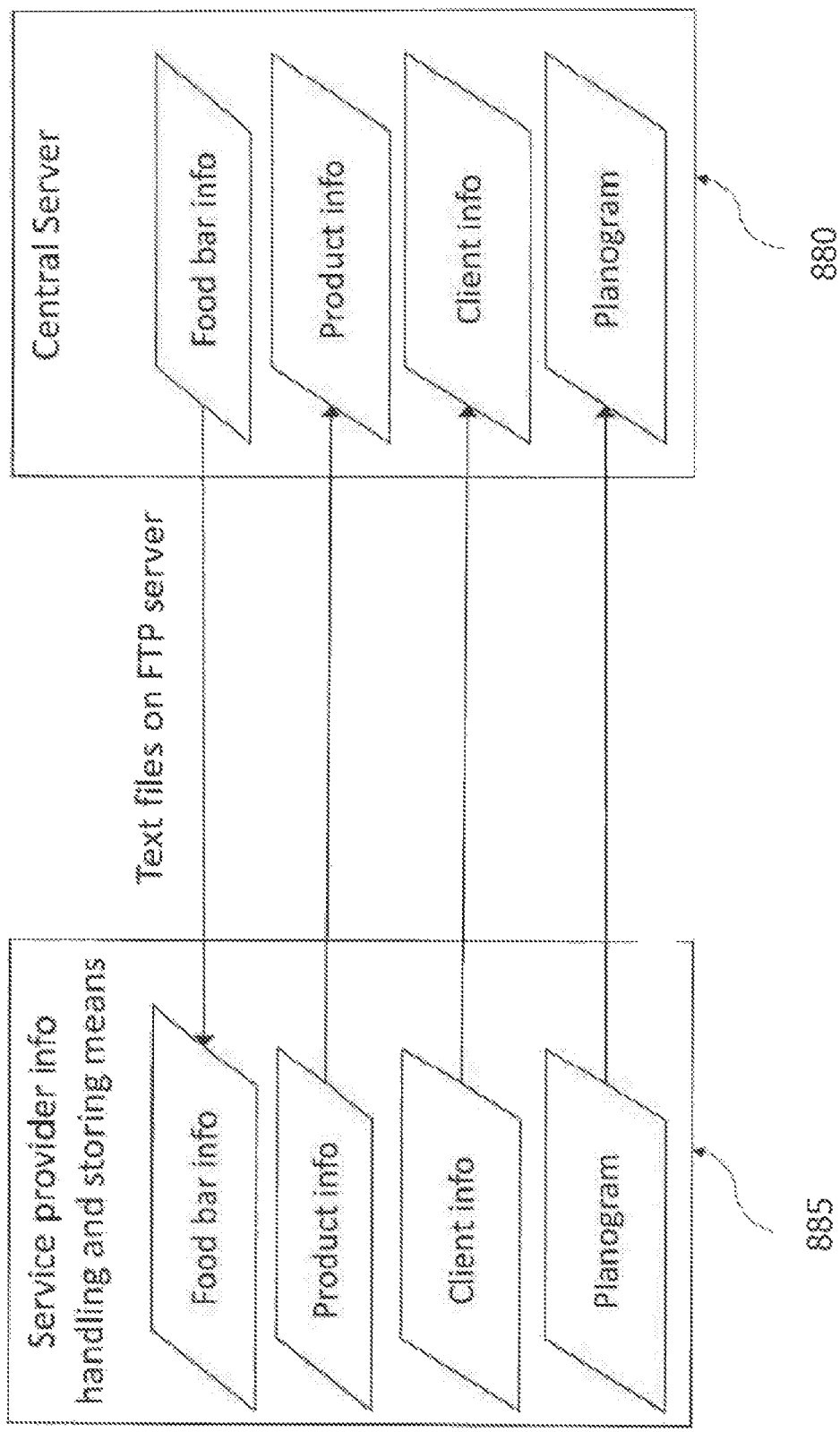
FIG. 3 is a schematic block diagram of a service provider information handling and storing arrangement and a central server.

FIG. 3 is a schematic block diagram showing the service provider information handling and storing means 885 providing product information, client (user) information and planograms to the central server 880. The central server 880 in turn provides information about the food bar arrangement to the service provider information handling and storing means 885. Integration takes place e.g. via exchange of text files using the FTP (File Transfer Protocol).

Figure 4:
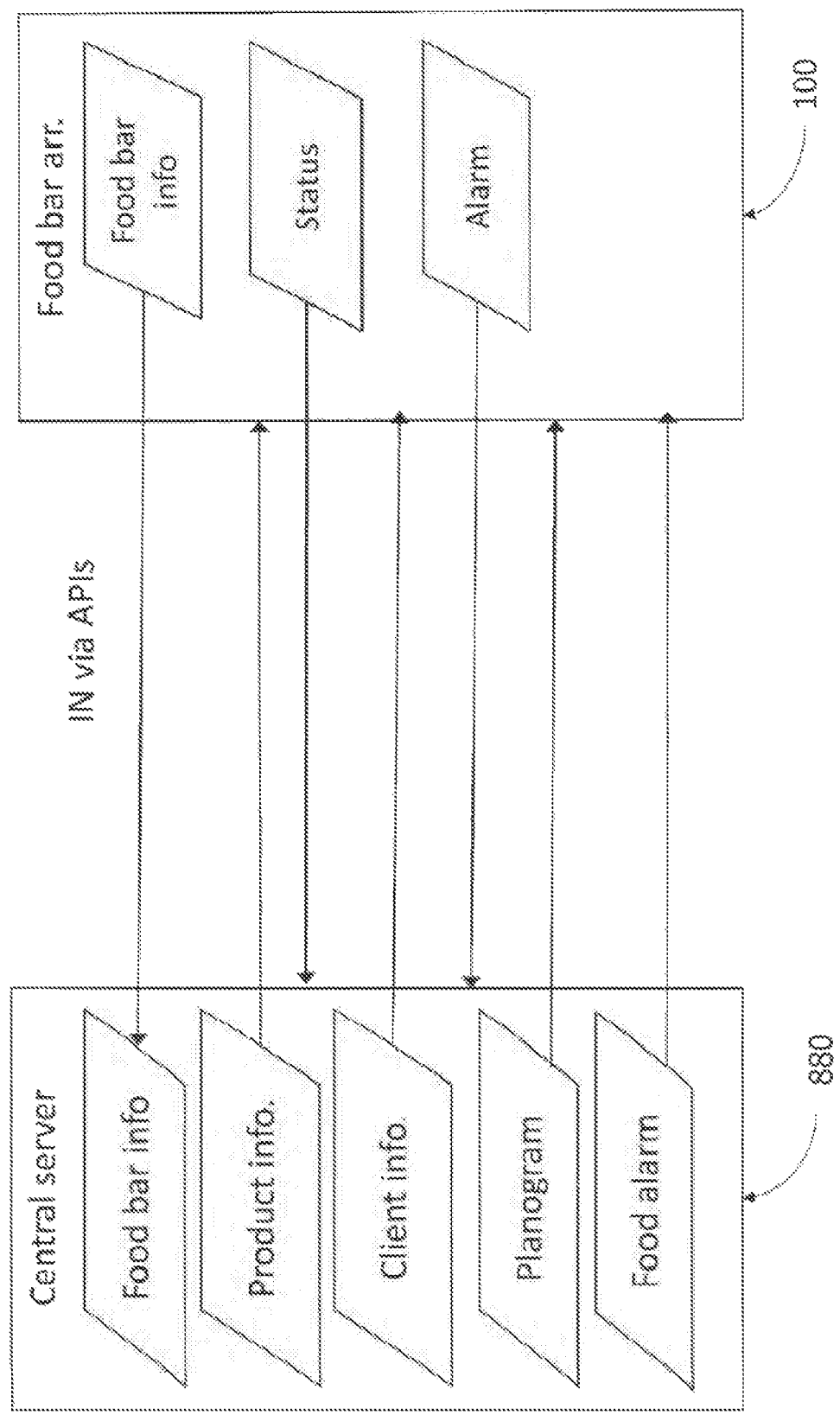
FIG. 4 is a schematic block diagram showing a central server in communication with an accessory unit server of a monitoring and controlling system in a food bar arrangement.

FIG. 4 in a schematic way illustrates communication between the central server 880 of the service provider and a food bar arrangement 100 comprising a number of FCUs and an AU. The integration, or the communication, takes place over the Internet based on customized or specially adapted APIs (Application Programming Interfaces) with the station serving unit server. In an advantageous embodiment the central server 880 provides the AU server disposed in the food bar arrangement with product information, client (user) information, planograms, and can also communicate food alarms to the food bar arrangement as mentioned above.

The product information may comprise information about article number, product name, a description of the product, nutrition value, food quantity declaration of contents, language handled. The client information may comprise information about client number, store information, contact person, contact information. The planogram comprises information about the placing or disposition, physical location, of food products in the food bar.

The AU 840 (the station serving unit server) in the food bar arrangement 100 may in an advantageous embodiment provide information to the central server 880 about the food bar arrangement, e.g. a serial number of FCUs and AU, and IP-addresses.

It may also provide information about status of products provided into the food bar, current status of said products, shelf life etc., and current status relating to the operation of the food bar, e.g. cooling capacity, sensed temperatures, fan rotation speed etc.

Still further it provides alarms to the central server 880, e.g. concerning temperature deviations from a predetermined interval, operation disorder or disruption etc.

Figure 5:
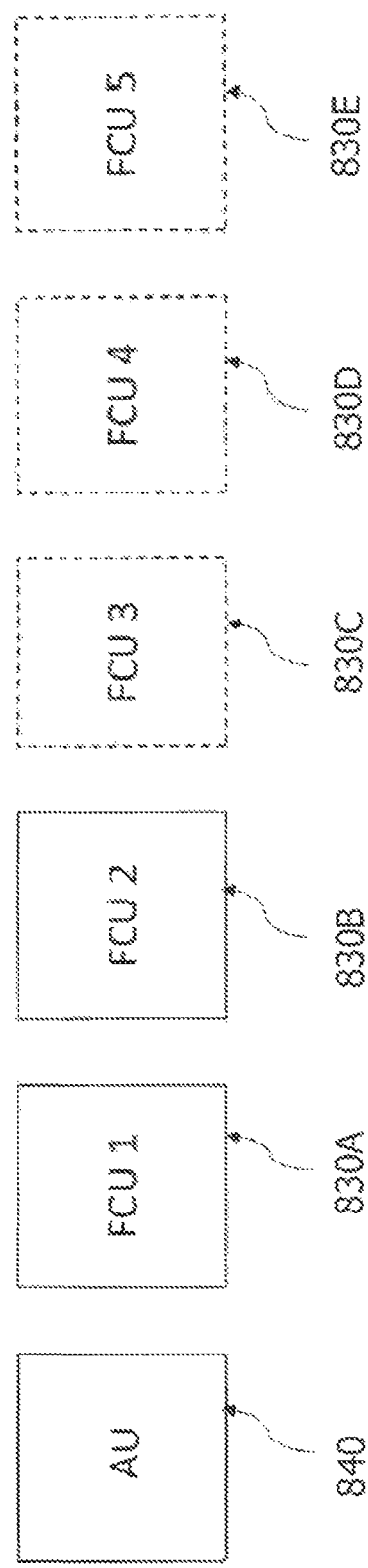
FIG. 5 is a very schematic block diagram of a food bar arrangement comprising a plurality of cooling units or modules and an accessory unit.

FIG. 5 is a very schematic illustration of a monitoring and controlling system 800 provided in a food bar arrangement comprising an AU 840 and five FCUs 830A, 830B, 830C, 830D, 830E which all are in communication with the AU 840 as also illustrated in FIG. 1.

It should be clear that the invention is not limited to any particular number of FCUs, each e.g. comprising a cooling unit or module with one or two back to back disposed modules or cabinet arrangements, a food bar arrangement 100 in this document being intended to comprise all FCUs or cabinet arrangements in communication with one and the same AU 840. Thus, there may be but one single-sided FCU, or up to five (here), six or more double sided FCUs. It should also be clear that there may be two or different types of AUs 840, e.g. one more advanced and one less advanced, or adapted for larger or smaller number of associated FCUs. The less advanced AU e.g. comprises no advertising display, and is of a smaller physical size.

Figure 6:
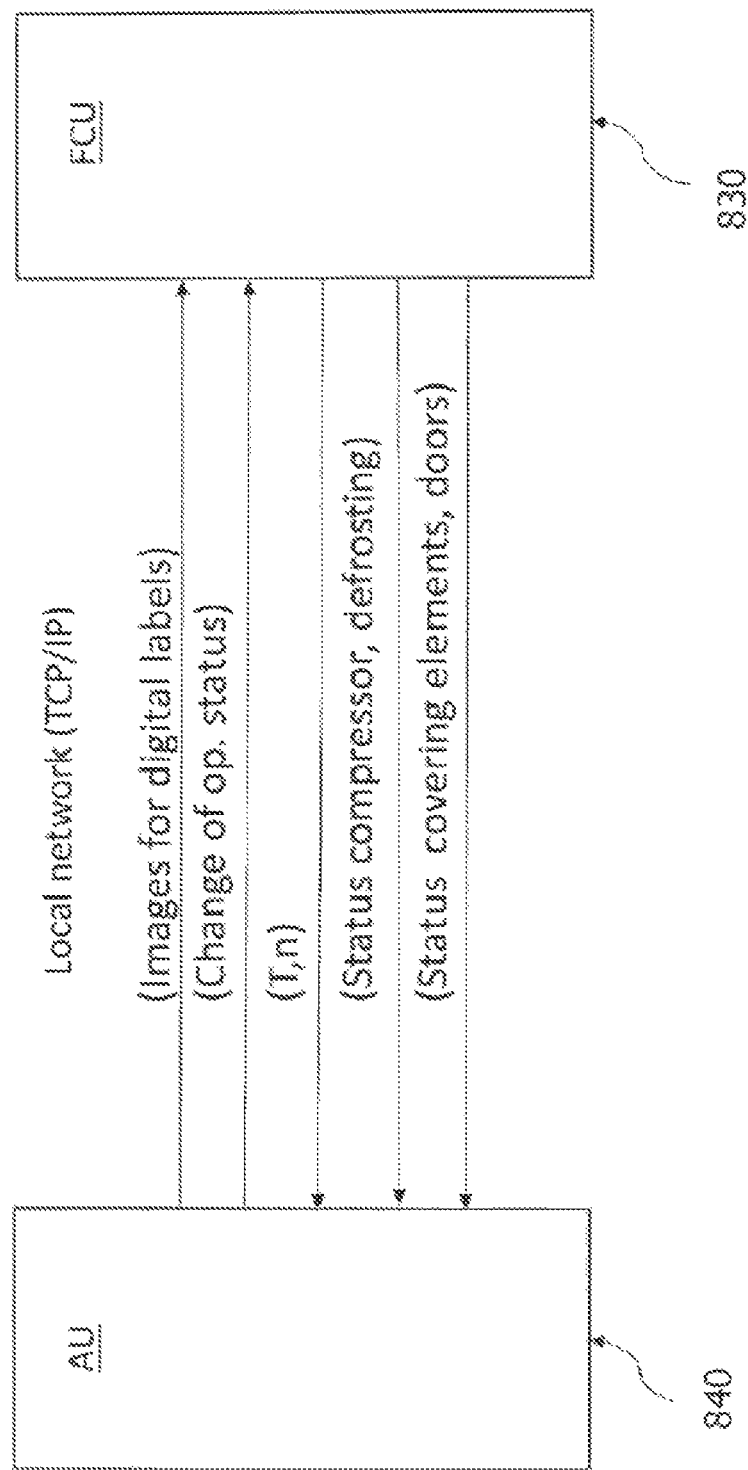
FIG. 6 is a schematic view of a cooling unit or module in communication with an accessory unit.

FIG. 6 illustrates the communication between the accessory unit AU 840 and an FCU 830 in an exemplary embodiment. The communication takes place over a local network using the TCP/IP protocol as also mentioned above. The AU 840 e.g. provides information or control signals for changing operational status of the FCU, e.g. normal operation, night operation, cleaning status. The AU 840 also generates images for digital labels and communicates them to the FCU 830.

The FCU 830 provides information about the registered current temperatures of all temperature sensors in the FCU, information about all fans, e.g. number of rotations or rotational speed, the status of the compressor, defrosting, e.g. thawing, the opening status of cover elements, doors etc.

Figure 7:
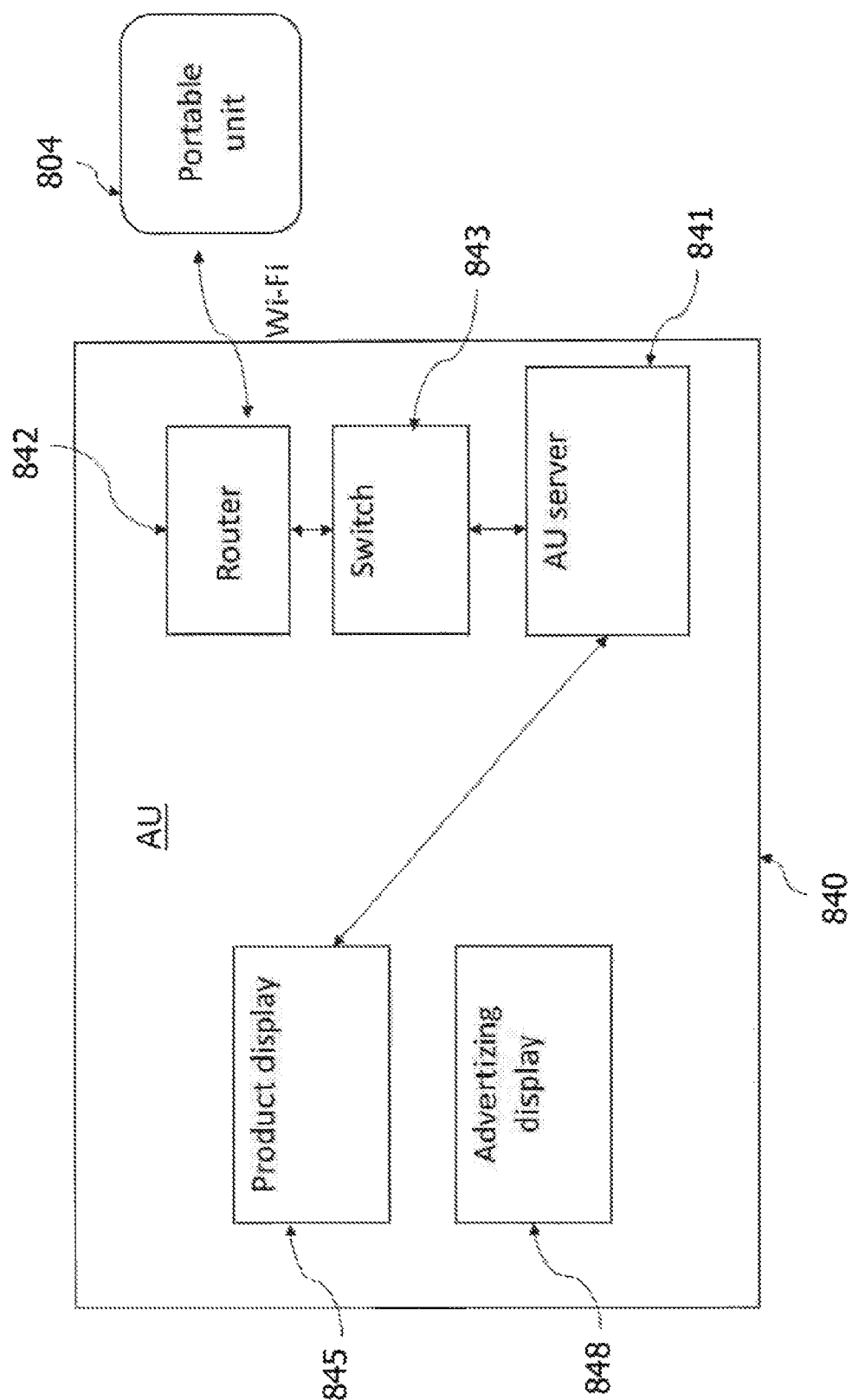
FIG. 7 is a block diagram illustrating elements of a monitoring and controlling system provided in an accessory unit and a portable unit.

FIG. 7 is a schematic block diagram of an accessory unit AU 840 and a portable unit 804. As referred to with reference to FIG. 1, the AU 840 comprises an AU server 841. In one embodiment, to which the invention of course is not limited, a Raspberry Pi computer with a Linux operations system is used as a server for the whole set up, and with which the portable unit 805 and the product display 845 communicate. It also handles synchronization with the central server (FIG. 4) and communication with the FCUs 830 via cable using TCP/IP. In a preferable embodiment the computer or the server 841 in AU 840 performs checks every night to see if there are any software program updates, and if there are, automatically installs them. A VPN server (not illustrated) may also be provided to assure a secure external connection for advanced maintenance and service. As referred to above, the entire monitoring and controlling system of a food bar arrangement functions also during periods of no Internet connection, and data is synchronized when the Internet connection is re-established. The AU 840 comprises a wireless router 842 for external Internet connection, and for internal interconnection with product display 845 and advertising display 848 (if such is provided). The switch 843 provides for interconnection of the AU router 842 and the AU server 841, or e.g. Raspberry Pi, in AU 840 and with the FCUs via cable using TCP/IP.

The product display 845 preferably comprises a touch screen for providing e.g. end users with extended, selectable, product information about currently in the food bar available products, and preferably also indicates the temperatures of all FCUs in the food bar arrangement. As referred to above it communicates with the AU server 841 via Wi-Fi. It preferably comprises an interactive display, and in an advantageous embodiment it may display different selectable menus, e.g. a menu of the day, of the week, a vegetarian menu etc. that may be selected, and then display the ingredients, products. By means of communication between the product display 845 via the AU server and the digital labels 805, the products of a selected menu may then be indicated on, or adjacent, the digital label 805 of products contained in the menu, or at the current location or position of the product, e.g. a colour in the digital label, or an associated lamp, be activated or similar to facilitate for the end user to find the products or ingredients of the selected menu. Different colours may be used for different menus. Many alternatives are possible.

The optional advertising display 848 provides additional information and advertising. In one embodiment an Android stick in a HDMI port via router 842 over Wi-Fi is connected to the Internet.

The portable unit 804 in an advantageous embodiment comprises an iPod touch, but of course the invention is not limited thereto; any appropriate, preferably portable, computer with a scanner can be used. The portable unit 804 communicates with the AU server 841 via the local network, Wi-Fi.

The start page of the portable unit 804 may show a main menu allowing selection of e.g. pans or canteens, holding positions, alarms, checklists (e.g. relating to reports concerning quality rounds), and planograms. The current AU and corresponding FCUs are indicated, and a canteen can be selected, in which case the status thereof is indicated, e.g. product info, remaining amount, in some cases batch number, remaining shelf time etc. The planogram may propose a product, or information about a scanned or selected product may be displayed. The current disposition of AU and FCUs is displayed, and an FCU section can be selected, which then is marked.

If the option "canteens" is selected on the main menu, all products currently provided in the food bar arrangement are displayed in timely order, with the product with the shortest remaining shelf time on top. In an advantageous embodiment, when there is a predetermined time interval left only, the product name or some indication may be shown with another colour than otherwise, e.g. be yellow or orange, whereas when the time is lapsed for a product, it is red marked or appears as red. Products are preferably selectable, and when selected, the current status of the product is indicated as well as its physical location in the food bar. This step may involve a switch to the planogram view for refilling according to a second procedure as will be discussed below. It is also possible to indicate that a product, despite its shelf time having run out, should be kept for a predetermined time period, i.e. be aged, depending on acceptable circumstances, e.g. a lowered temperature or for other reasons.

The option "Planogram" may in an advantageous embodiment be selected on the main menu, which also may contain options or proposals for the arrangement of products in the food bar arrangement.

For arranging food products in the food bar, and for refilling, the scanning functionality of the portable unit 804 is used to scan QR codes (Quick Response code) or other codes provided on disposable or one-way canteens filled with product. If a canteen is not provided with a QR code or similar, a product may be selected by selection from a list or similar in e.g. the menu. After that a pan or a canteen with a product may be directly placed in the food bar if a recommended planogram is followed, and the proposal accepted. In alternative embodiments reusable pans or canteens may instead be used which are marked e.g. with a QR code or similar, which can be removed or altered.

When a product or pan (canteen) code, e.g. a QR code, is scanned, different pieces of information are read or stored, such as for example one or more of supplier identification, e.g. a supplier id, an article or product identification, which are provided by the service provider. Also the last date for consumption or shelf life and, if applicable, the best-before date are read and stored. Advantageously also a label identification number is read and stored.

Through the scanning of the codes and storing the corresponding location of the scanned product or pan (canteen) codes, it is possible keep control of the current location in a food bar of every pan or product, as well as information about how long it has been in the food bar, remaining shelf time etc. It is possible to actively remove a product (or pan) from the food bar, in practice as well as from the monitoring and controlling system. Also, if a product is removed in practice, but the monitoring and controlling system is not informed, or the corresponding option is not selected, as soon as a new scanned pan is disposed at the location, the old product or pan will be removed from the monitoring and controlling system.

As an example, for refilling a product in the food bar, the scanner function of the portable unit 804 is activated by activating the camera symbol, and the code of the pan is scanned. When it has been scanned, it is shown on the display of the portable unit 804 which product was selected. If the product is contained in the planogram currently used by the client, a location in the food bar arrangement is indicated or proposed. If there already is a product or pan at said location, information about such product is indicated as well as the remaining time for that product. The client then has different options. Either to accept the location of the new product and indicate that by an acceptance or similar, e.g. on the display, or to select another position. If there is a considerable time left for an old product, it can be kept and new product be added on top of it. Then the information about remaining time or best before date of the old product is kept.

An alternative procedure for refilling may be to first select a pan that should be replaced. The locations of the pans are displayed on the portable unit, and a pan may be selected, it will then be marked, e.g. by being displayed in another colour than the other canteens. Information about the old product is displayed, and in the planogram view a proposed new product is indicated, which may be accepted or not. It is also possible to scan the code of another product, and add (keeping remaining time information of old product) or replacing the old product.

It should be clear that there are many different alternative ways in which information can be displayed, which information that is displayed, which different options are provided, the main thing being that information about different products or pans is clearly indicated, and that also information about where different products are located and the remaining time for all products is easily retrievable and displayed in a clear manner.

As referred to above, the portable unit 804 also receives information about alarms, holds up to date information about quality rounds, reminders thereon, and the remaining time of products and generates alarms if it has lapsed, and reminders if it is about to lapse. It is also possible to, at any time, obtain current, up to date information, normally updated in real-time, about all products in a food bar arrangement for a user or client (and, for the service provider, about all food bar arrangements).

Figure 8:
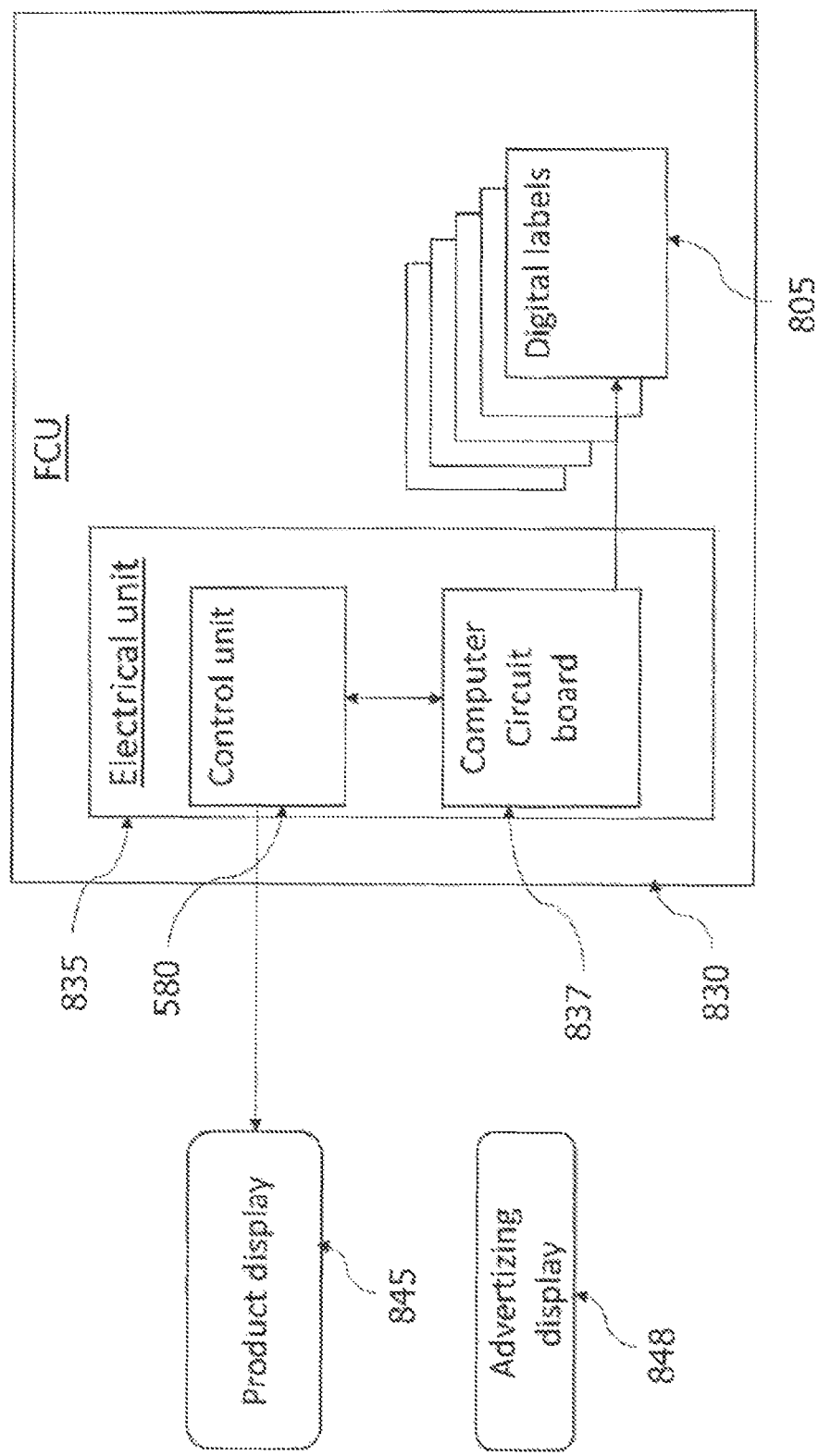
FIG. 8 is a block diagram illustrating a cooling unit or module.

FIG. 8 is a schematic block diagram of an FCU 830 showing means and elements relevant for the monitoring and controlling system according to advantageous embodiments of the present invention. The FCU 830 comprises what in this document for reasons of simplicity is referred to as an electrical unit 835 comprising a control unit 580 (see also FIG. 10) for controlling the cooling system, the opening of cover elements and doors, compressor, fans etc. It also comprises a computer, e.g. Raspberry Pi, and one or more dedicated circuit boards 837. Software is also provided for handling generation of images on the displays of the digital labels 805, one for each pan or pan holder element position, and each is mounted on a circuit board designed for the purpose. The product display 845 and the advertising display 848 are preferably mounted on the AU, cf. FIG. 7, but could of course in alternative embodiments also be mounted elsewhere, and are illustrated in FIG. 8 merely to show that the product display receives information also from the control unit 580.

Figure 9:
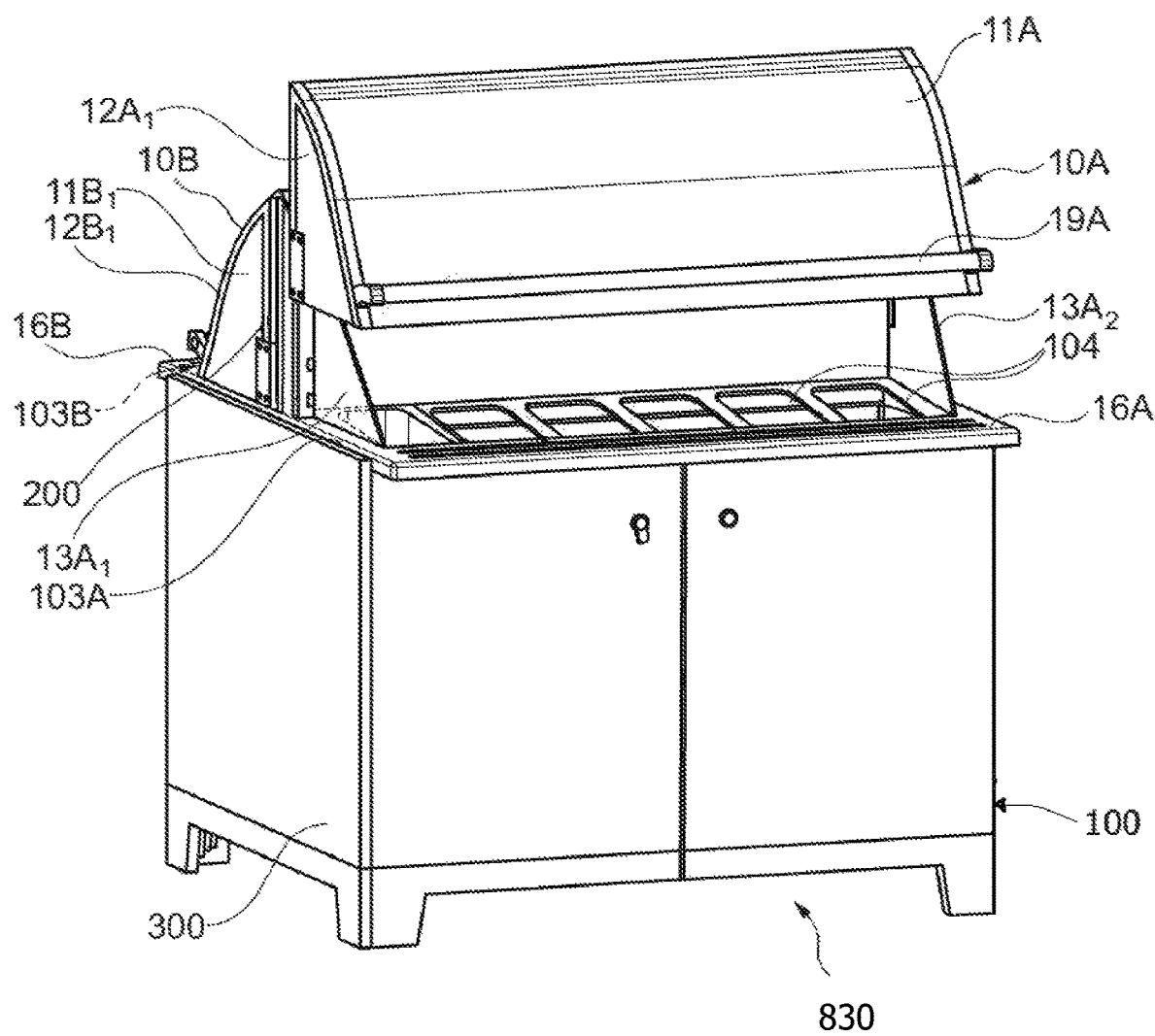
FIG. 9 is a schematic view of an exemplary cooling unit or module (FCU) of a food bar arrangement comprising a monitoring and controlling system according to one embodiment.

FIG. 9 shows one FCU of a food bar arrangement 100 according to a particular embodiment in which the monitoring and controlling system as described above is implemented. It comprises an openable/closable covering arrangement 110 with two covering elements 10A,10B adapted to cover canteens or pans 104 (in the following only denoted pans) arranged in a holding arrangement 103A,103B comprising a cabinet (also called cupboard or bench arrangement) 300 with tray slides 16A,16B, where the digital labels 805 (see FIG. 1) are located. Other covering arrangements may of course also be used.

In the illustrated embodiment the food bar arrangement 100 comprises one or more holding arrangements 103A, 103B in which a plurality of pans 104 are to be disposed, in pan holders 106A,106B. It further comprises a cooling system with a refrigerating arrangement. The cooling system comprises a cooling arrangement 200 for cooling the pans for keeping the food products at a desired temperature, e.g. above 0° but below 8° C., or within a more specified temperature interval. The cooling system according to the invention is adapted to cool, and allow for separate control of the cooling of, at least two different climate zones, or such that at least two different climate zones are provided. A first climate zone here comprises the cooling arrangement 200 as will be further discussed below.

The holding arrangement(s) 103A,103B is/are comprised in one or more cabinet arrangements 300, and form or comprise cold wells, troughs, adapted to receive and hold the pans in such a manner that the food is accessible from outer side sections of the holding arrangements 103A,103B, hence allowing a customer to choose and pick from the pans from two sides (here).

The covering elements 10A,10B are adapted to cover the pans 104 from above so that the content is protected in time periods between customers accessing the content etc., and can be transferred from an open position, in which access to the content in the pans is provided, to a closed position. In FIG. 1 covering element 10A is in an open position whereas covering element 10B is in a closed position preventing access and protecting the content in the pans 104 on one side of the food bar. Each covering element 10A,10B comprises a front section 11A,11B exhibiting a vaulted shape, a rear section (not shown) and two side sections $12A_1, 12A_2, 12B_1, 12B_2$ (not all shown in FIG. 1) interconnecting respective opposite outer edges of the respective front and rear sections in such a manner that two covering hoods are formed with one another facing, and extending in parallel to one another, substantially plane rear sections, which in a mounted state of the covering arrangement are disposed in a vertical manner, forming rear walls. The edges of the first side sections $12A_1$, $12A_2, 12B_1, 12B_2$ connecting to, or being arranged adjacent to, the rear sections are vertically disposed whereas the edges connecting to the front sections taper upwardly to a location where front and rear section upper edges meet or are joined by means of a frame structure.

Said rear walls, or rear sections, are here disposed at a distance from one another, leaving space for a cooling arrangement 200, also denoted cooling tower, between them. The upper end of the cooling tower 200 in some embodiments is contiguous with the upper end of a mounted covering arrangement 100 (when the covering elements are in their closed positions).

In other embodiments the cooling element 200, or the covering arrangement 110, is adapted to have such a height that the upper end of the cooling element 200 will be disposed below the position assumed by the upper end or edge of the covering element(s) in its (their) closed position. Alternatively the cooling element(s) protrude(s) above the covering arrangement in its closed position, although its active portion, as far as its cooling functionality is concerned, preferably terminates at the upper end of the covering arrangement.

Each covering arrangement 10A,10B is equipped with an actuating element 19A,19B, e.g. a gripping element or a handle by means of which an end user, and a user or client, accessing the products in the pans, can bring the covering arrangement 10A,10B from a closed position to an open position and vice versa.

The front section 11A,11B of a covering element 10A, 10B is preferably made of a transparent material. The side sections and the rear sections may be made of the same material as the front section, or of other appropriate materials.

In order to transfer a covering element 10A,10B from a closed to an open position, it is moved in a vertical direction between a first, lower, position, the closed position, (covering element 10B in FIG. 1), in which it substantially is in contact with an upper side of a holding arrangement 103A, 103B, preventing access to the pans, and a second, upper position (covering element 10A in FIG. 9) in which access is provided to the pans.

The covering elements 10A,10B are movable between said first, closed, and said second, open, positions by means of a covering arrangement mounting and driving structure comprising guide rails in which a slide or pulley mounted on the covering element can run. In order to bring a covering element 10A,10B from a closed position to an open position, a slight force has to be overcome to allow it to subsequently slide or move upwardly, substantially with no resistance, until it reaches the upper, open, position. Vice versa, when it is to be moved from the upper, open, position to the lower, closed, position, a slight force, somewhat higher than the slight force referred to above for the closing operation, has to be overcome after which it is moved automatically slowly downwards. Alternatively gas springs are used to allow the covering elements slide upwards and downwards with respect to a vertical mounting structure. The mounting structure may be provided with vertically disposed guide rails arranged in parallel for cooperation with the respective rear outer edges of a single cover element, or it may be a dual mounting structure adapted to receive two covering elements 10A,10B as in FIG. 1, which independently can slide up and down by means of respective guiding rails as will be further described below. If the covering element is moved by means of a vertical translation between an open and a closed position, it will not sweep out over the tray slide during the movement, in addition to the other advantages discussed herein.

Another feature in this particular embodiment is the provisioning of the first side sections $12A_1$, $12A_2$, $12B_1$, $12B_2$, and in particular of second, preferably, but not necessarily, fixed or detachably mountable, second side sections or additional side walls $13A_1,13A_2$, $13B_1,13B_2$ (the latter not shown in FIG. 9). Said second side sections $13A_1,13A_2$, $13B_1,13B_2$ in advantageous embodiments have substantially the same, or a similar, shape as the first side sections $12A_1$, $12A_2$, but with slightly reduced dimensions so as to admit the first side sections to, in a closed position of the covering elements, be disposed on the outer sides of said second side sections, at a slight or minor distance therefrom such that said second side sections will be located closest to the pans. Said second side sections will contribute in maintaining an even temperature distribution since by preventing cool air from escaping from the region above the pans when the covering element is in an opened position, and preventing warm air from entering.

Thus, through the particular arrangement of the rear sections of the covering elements adjacent to a cooling element, and movably with respect thereto, such that when a covering element is in an open position, the rear section is moved upwards, exposing a larger area of the cooling element, hence resulting in an increased cooling of the pans, and further the implementation of the second side sections, the covering arrangement will, to a considerable extent, contribute to keeping an even temperature distribution in the food bar.

Figure 10:
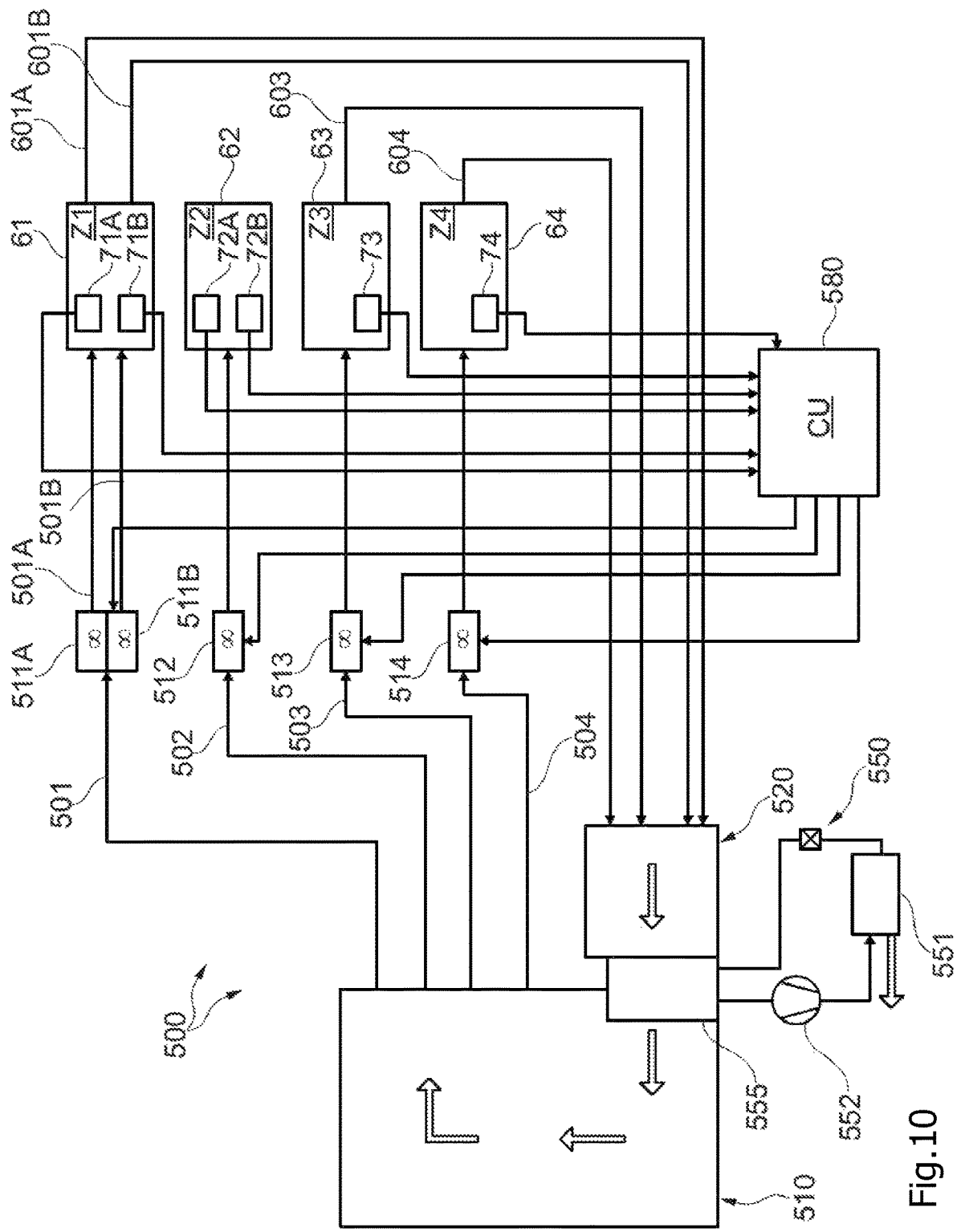
FIG. 10 is a schematic block diagram of a cooling system of the exemplary food bar arrangement of FIG. 9.

FIG. 10 is a schematic block diagram of the main functional entities of a food bar arrangement according to the embodiment of shown in FIG. 9. It comprises a cooling system 500 comprising a refrigerating system 550 including a condenser 551, a compressor 552 and an evaporator 555. The functioning of such a refrigerating system will not be further described since it is supposed to be known to the man skilled in the art, and it may be of substantially any known, appropriate kind.

The cooling system is arranged to comprise a first or main cooling chamber 510 provided on the output side of the evaporator 555, or after the evaporator, and a pre-cooling chamber or a recirculation chamber 520 on the input to the evaporator, i.e. before the evaporator in the cooling medium flow direction. The cooling arrangement 200 is arranged for cooling in the first zone as will be further explained below. The evaporator 555 is connected to a plurality of zone conduits 501,502,503,504, at least one connecting to or communicating with each a climate zone, here four different climate zones Z1,Z2,Z3,Z4, for cooling said zones. On the respective zone conduits speed controlled shunting fans 511A,511B,512,513,514 are provided for the respective climate zones.

The temperature of the main cooling chamber is controlled to hold a temperature of approximately between −15° C. and −20° C., substantially never below −20°, which normally is the coolest temperature the shunting fans can tolerate. It can alternatively be controlled to have any other temperature that is tolerable by the shunting fans. (The temperature at the evaporator is between about −20° C. to −25° C.).

A first zone conduit 501 carries cooling medium (cooled air), assisted by two shunting fans 511A,511B, to the cooling arrangement 200,200' of, or for cooling the first zone Z1 via two separate zone conduit inlets 501A,501B (cf FIGS. 12,13) where the symmetrically disposed inlets 202,202 are indicated). Instead of two (or more) shunting fans, one fan with a high power might be used to assure a high flow to the cooling arrangement.

The first climate zone Z1 61 comprises at least two temperature sensors 71A,71B for sensing the temperature on each side of the cooling arrangement 200, i.e. in the first zone Z1. The temperature sensors are connected to the control unit 580 (See FIG. 8) which is common for all the zones, and information on the temperature in the zone is continuously, or at discrete time intervals, provided to the control unit, which in turn is in communication with the shunting fans 511A,511B for controlling the speed thereof at least depending on the sensed temperature.

The first climate zone Z1 also is connected to the pre-chamber or the recirculation chamber 520 of the cooling system 500 by means of recirculation conduits 601A,601B (cf outlets 203 in FIG. 11) allowing air to recirculate from the first zone, which forms a substantially closed system.

The temperature in the recirculation chamber will be about $-3°$ C., the difference in temperature between the main cooling chamber 510 and the recirculation chamber hence being about $15°$ C.

Figure 12:
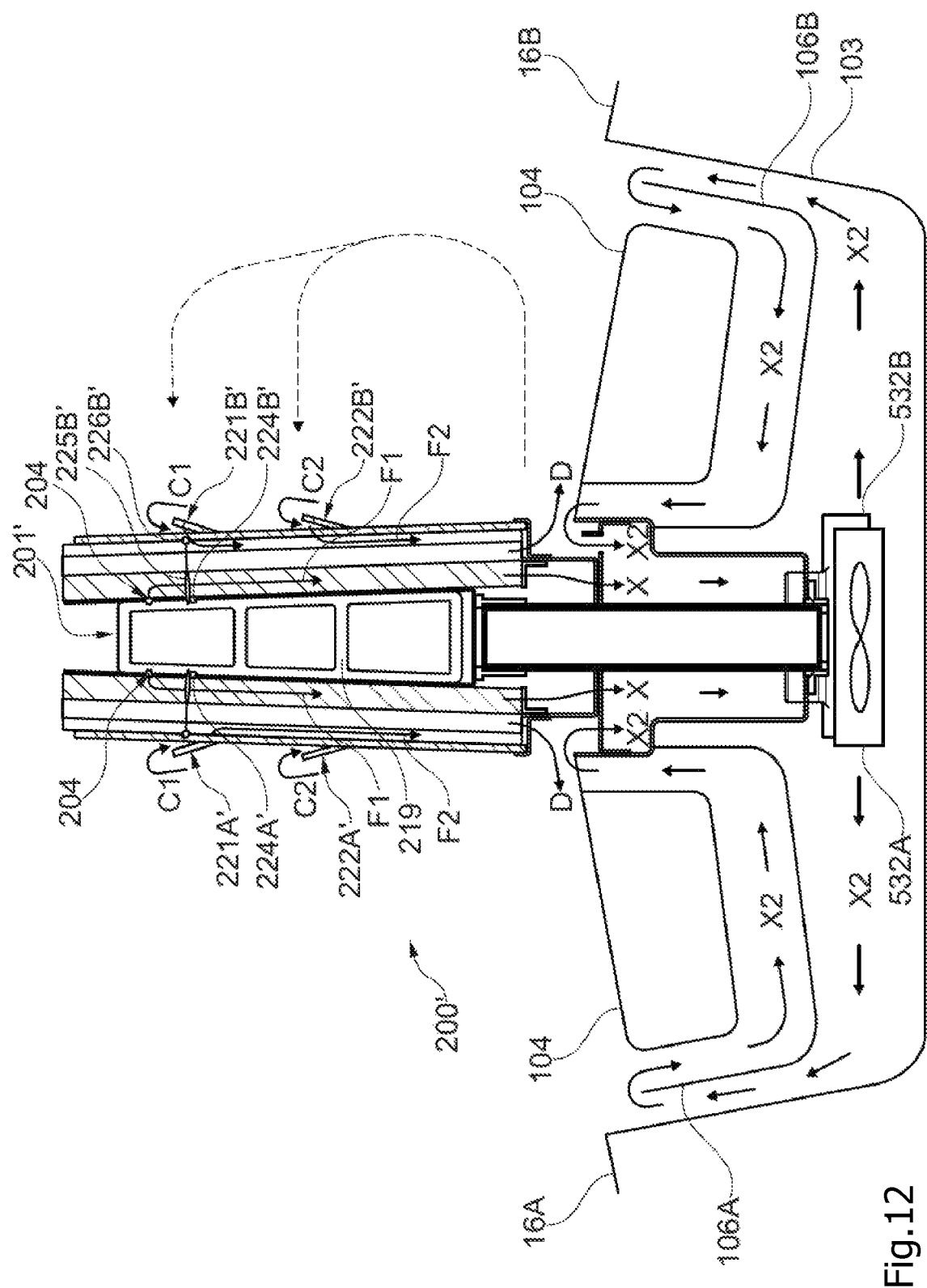

In a similar manner a zone conduit 502 is provided from the main cooling chamber 510 to the second zone Z2 62 comprising the cold wells or the trough(s) (see FIG. 12). A shunting fan 512 is provided on the conduit 502, the speed of which is separately controlled via signals from the control unit 580, to which information about the temperature in the second zone Z2 62 is provided by means of temperature sensors 72A,72B in the trough, at least one on each side for a dual sided food bar. However, there are no return conduits from the second zone Z2 62, and the cooled air is not recirculated, but it is allowed to flow out on the tray slides. The provisioning of a return conduit might result in air in the trough leaking into one of the other zones, e.g. due to a problem such as a malfunctioning valve or any other cooling problem in a zone, by means of a back suction flow. Thus, instead of using a recirculation conduit, air escaping from the second zone is replaced by means of a separate input, e.g. to the main cooling chamber 510, i.e. arranged after the evaporator 555. Particularly the temperature in the first zone, above the pans, is controlled to be about $2°$ C.

The second zone Z2 62 receives cooled air in two ways, from the cooling arrangement 200 (see e.g. FIG. 12) and via the zone conduit 502 whereby cooled air controllably can be shunted in. In the second zone Z2, the temperature should preferably be about $2°$ C., although in principle also other temperatures can be used, the main issue being that the temperature can be efficiently and separately controlled to have the desired value.

Also the third zone Z3 63 comprises a temperature sensor 73 for sensing the temperature, information on which is provided to the control unit 580, for regulating the speed of a shunting fan 513 on the third zone conduit 504 from the main cooling chamber. The third zone 63 here comprises a refrigerator. It is provided with a recirculation conduit 603 as discussed above with reference to the first zone Z1 61.

The food bar arrangement in this embodiment also comprises a fourth zone Z4 64 comprising a thawing unit. A fourth zone conduit 504 is provided between the main cooling chamber 510 and the fourth zone, which further also is connected to the recirculation chamber 520 by means of a recirculation conduit 604. The fourth zone also comprises a temperature sensor 74 which is in communication with the control unit 580, for separate regulation of the speed of a shunting fan 514 on the fourth zone conduit 504. The thawing unit comprises a heating element, which is also connected to the control unit 580. The thawing unit may comprise a refrigerator which further comprises said heating element.

Thus, for a plurality of climate zones it is possible to use one common evaporator, and for each climate zone, separate shunting fans are provided, the speed of which can be separately controlled. Hence, additional cool air is shunted into the respective zones by the respective shunting fans when needed, and to the extent that is needed in the respective zone, e.g. depending on the detected temperature in the zone with respect to a desired or needed temperature. The cool air circulating under the covering elements is not fan driven.

The food bar arrangement may e.g. comprise two refrigerators (third zone) arranged back to back, and a thawing zone (forth zone) disposed behind, or on the backside of, the machine house comprising the refrigerating arrangement. The length of such a food bar arrangement (cabinet) may be 1200 mm, a standard length for transportation within Europe, hence facilitating transportation and storing.

In order to melt ice generated in the evaporator 555 a defrosting arrangement is provided. In one embodiment it comprises a heating arrangement. Alternatively a catalytic frost eliminator device is provided in the evaporator 555. Still further, both a heating device and a catalytic frost eliminating device can be used, i.e. allowing the heating device to be switched on only when needed.

A fan 551 is provided on the condenser, and temperature sensors (not shown) are provided for sensing the temperature before and after the evaporator, which generally is not allowed to have a temperature below $-20°$ in the main cooling chamber in order not to ruin the shunting fans.

Zone conduits 501,502,503,504 are provided for conducting the cooling medium to the respective zones 61,62,63,64, and on which speed regulated shunting fans 511A,511B,512, 513,514 are provided. After each shunting fan a respective non-return valve 521,522,523,524 is provided to prevent any back-flow from the respective climate zone.

Recirculation conduits are provided from the first, third and the fourth zones 61,63,64. To replace leakage of cooled air from the second zone 62 (the trough), an inlet (comprising a non-return valve) may be disposed before the evaporator.

The first zone Z1, comprising the cooling arrangement 200, may comprise two fan blowers 541A,541B, see FIG. 12, which are optional, and/or only activated if there is a need of additional cooling. If they are activated, air is blown downwards, on the outside of the cooling arrangement.

Position or motion sensors (not shown) are provided in the first zone 61 for registering the position of the covering elements. Information on whether a covering element is closed or opened, or moved from a closed position and/or vice versa, is provided to the control unit 580 (see FIG. 8). If a covering element is opened, more cooling power is needed, and the rotation speed of the shunting fans 511A, 511B, and also of optional circulation fans, is increased by means of the control unit 580, receiving information on the opening state of the covering elements by means of a position or motion sensor.

Also the third zone comprising a refrigerator comprises a position or motion sensor (not shown) for detecting if a door is open or being moved from the closed position etc., in which case information thereon is provided to the control unit 580, which provides a signal to, or in any appropriate manner regulates, the shunting fan 513 (and the circulation fan). Optionally also the fourth zone 64 comprises a position or motion sensor.

The second zone 62 is in an advantageous embodiment provided with circulation fans (not shown) (one for each side of the food bar arrangement, each trough or each side of a common trough) in the holding arrangement, which also are controlled by or via the control unit 580 based on temperature information. If the temperature is too high, or exceeds a predetermined value, the speed of the shunting fan, and of the circulation fan(s) is/are increased and vice versa.

Also the third zone comprises a circulation fan 533 which also is controlled by the control unit depending on the detected temperature in the refrigerator with respect to a predetermined value. Further, information on the opening state, sensed by a position or a motion sensor of the door of the refrigerator, is used to switch off the circulation fan (not shown) if the door is open or opened, and vice versa.

The circulation fans in the second and the third zones may be run at a constant rotational speed of e.g. 80%, and switched off if the covering elements or the doors are opened.

The fourth zone 64 (the thawing unit) also comprises a circulation fan (not shown), and in addition thereto a heating element (not shown). They are controlled via the control unit 580 based on information on the temperature as detected by the temperature sensor in the fourth zone.

The evaporator 555 is located below the second zone Z2 wherein the pans are held. The main cooling chamber 510 is located after the evaporator 555, and the recirculating chamber 520 is disposed before the evaporator in the flow direction of the cooling medium. The shunting fans 511A, 511B,512,513,514 are used for shunting cooled air into the respective zones, via symmetrically disposed zone conduits 501A,501B up into the cooling arrangement 200 comprising he cooling tower, via zone conduits 502A,502B to the second zone comprising the troughs or cold wells, and via zone conduit 503 to the third zone comprising the refrigerating arrangement respectively. The zone conduit to the fourth zone is not shown. Via symmetrically disposed recirculation conduits 601A,601B air is recirculated from the first zone Z1, comprising the cooling arrangement 200, to the recirculation chamber 520. Air is also recirculated via recirculation conduit 603 from the third zone. The recirculation conduit from the fourth zone is not shown.

Via circulation fans of the second zone Z2, on opposite sides of the conduits, air is blown out in two opposite directions, in under the pans.

The flow to the cooling tower (zone Z1) is similar in both first zone conduits 501A,501B. The first zone comprising the cooling arrangement forms a closed system.

Figure 11:
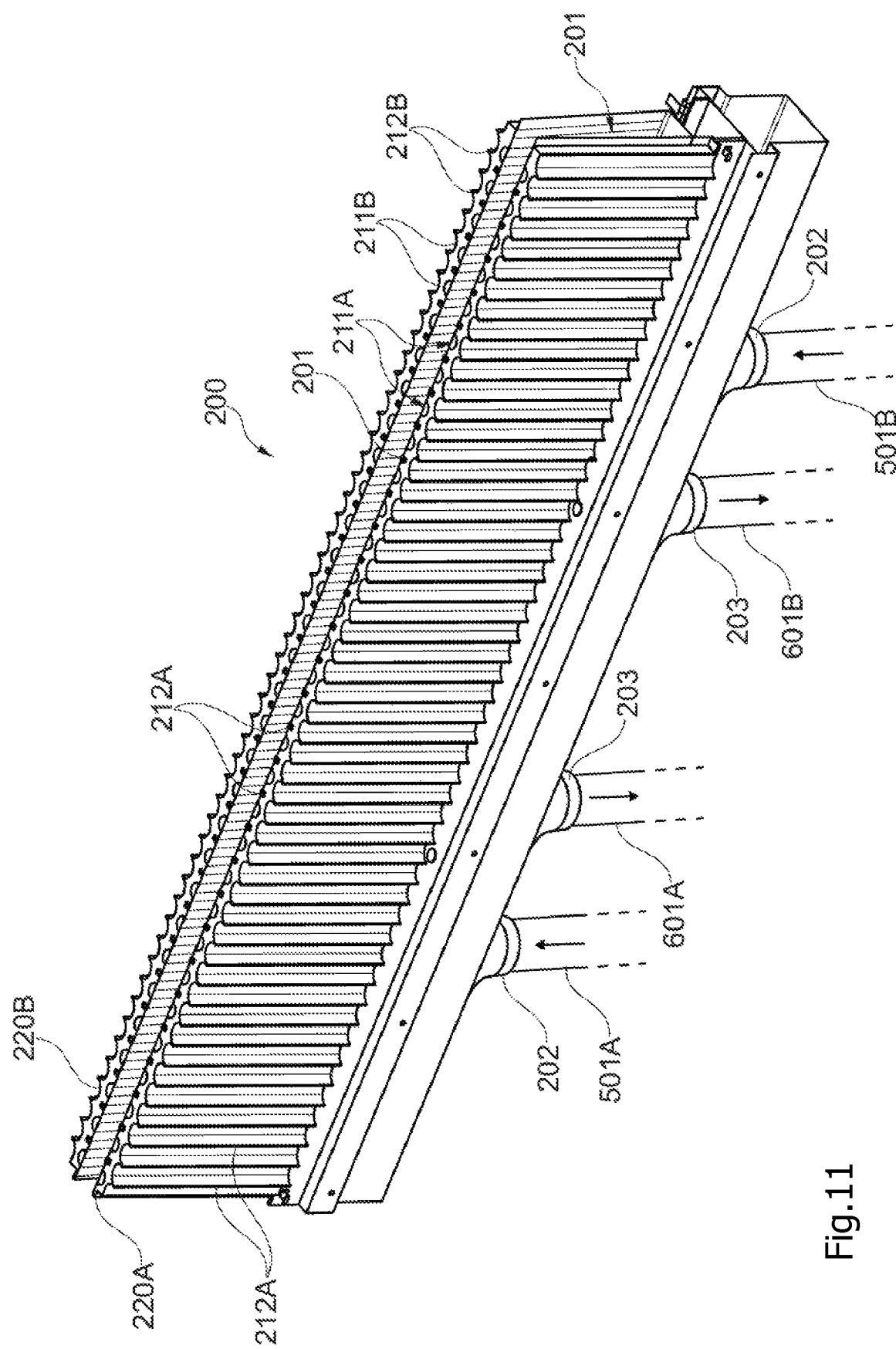
FIG. 11 shows a cooling arrangement for cooling a first climate zone of the exemplary food bar arrangement of FIG. 9, FIG. 12 schematically illustrates cooling of a first and a second climate zone by means of the exemplary food bar arrangement of FIG. 9.

FIG. 11 shows a cooling arrangement 200 comprising a cooling medium conduit 201, on two outer longitudinal sides of which two first cooling plate elements 210A, 210B are disposed, which may be used in the cooling system as discussed above for cooling of the first climate zone Z1, for a dual sided food bar arrangement. Reference is made to the Swedish patent application no. 1450665-3, filed Jun. 2, 2014 by the same Applicant and the content of which herewith is incorporated herein by reference. The cooling medium conduit 201 is provided with two inlets 202, 202, connecting to, or comprising the zone conduits 501A,501B through which a cooling medium is introduced, and on which the shunting fans are provided. The cooling medium then circulates in the branch conduit 201, which also is provided with two symmetrically located (return) outlets 203, 203, also arranged symmetrically with respect to the inlets, here at a slight distance from the inlets 202, 202, in a direction towards the centre of longitudinal extension of the cooling medium conduit 201. The return outlets are connected to, or comprise, the first recirculation, or return, conduits 601A,601B. To provide an even temperature distribution the inlets and outlets are disposed in a symmetric manner, with respect to the centre of the cooling medium conduit and with respect to one another.

The same amount of cooling medium is input on the first zone conduits 501A,501B to each inlet 202, 202 to provide an even distribution of cooling medium in the cooling medium conduit.

The cooling medium is air or a cooling liquid, e.g. comprising water or any appropriate cooling medium. The temperature of the cooling medium depends on the surrounding outer temperature, and on the temperature(s) that is/are desired in the food bar. In some implementations, in which the cooling medium is air, or an air mixture, the temperature is about −20° C. If the cooling medium is water based, the temperature could be about −3 or −4° C.

The first cooling plate elements 210A, 210B comprise a plurality of internal flanges or ribs 211A, 211B extending in parallel, and a plurality of external cooling flanges 212A, 212B extending in parallel in a direction substantially orthogonal to the longitudinal extension of the cooling medium conduit 201. The external flanges 212A, 212B are preferably arranged at a larger distance from each other than are the internal flanges 211A, 211B.

A cooling medium, e.g. air, is introduced into, and circulates in the cooling medium conduit 201. It particularly holds a temperature of about −20° C. Regularly spaced from one another, at a distance, e.g. 10-15 mm from the upper edge of the branch conduit 201, and all along its upper edge in a symmetric manner, a plurality of circular openings 204 (see FIG. 12) with a diameter of about 4-5 mm, are disposed, e.g. symmetrically in a row. The cool air escaping through the openings 204 will flow downwards, along the outer side wall surfaces of the cooling medium conduit 201, into the space formed between said outer surfaces and in "channels" formed by the internal flanges of the first cooling plate elements 210A, 210B which are disposed in parallel with the outer surfaces, at a small distance. Due to the internal flanges, i.e. the inner increased effective area, the cooling plate elements 210A, 210B is efficiently cooled by means of the cooling medium conduit, and the cooling transfer capacity will be enhanced, and due to the external flanges 212A, 212B, the effective area for cooling transfer on the outside is also increased. The outer side of the cooling arrangement 200 preferably holds a temperature in the range of −3° C. to +2° C.

Optional auxiliary circulation fans can be activated when there is a need for additional cooling power, or under more or less extreme conditions, such as a high surrounding temperature, or for products requiring a particularly low temperature. Such auxiliary fans are then preferably also controlled via the control unit 580 depending at least on sensed temperature in the zone Z1.

FIG. 12 is a very schematic view in cross-section of a cooling arrangement 200' taken through walls of the flanges (see below), and flows F1, F2 are schematically indicated although the actual flow channels between flanges cannot be seen. On both sides of the cooling medium conduit 201' first cooling plate elements 210A', 210B' with internal and external flanges are provided. Cool air flows through openings 204' along the outer side walls of the cooling medium conduit 201', whereas by means of the inner flanges the effective cooling area is enhanced, efficiently cooling the first cooling plate elements 210A', 210B', which via the external flanges provide a high cooling capacity in the channels formed on the outer sides. Air entering via gill openings via self-convection, arrows C1, C2, is further cooled in the space or the channels formed by the external flanges, and flows out, arrows D, over pans, not shown, hence cooling the products therein. Arrows X indicate air flows returning to the evaporator of the cooling system. Booster openings 224' in the outer walls of the cooling medium conduit 201', and corresponding gill openings 225', 226' in the first and second cooling plate elements respectively, additionally assist in cooling down the air entering the upper gills 221A', 221B'.

In FIG. 12 also the cooling of second climate zone Z2 is indicated. It is schematically illustrated how the pans 104 are disposed in holder elements 106A,106B provided in the holding arrangement 103 such that the shunting fans 532A, 532B assist in forcing the air to flow as indicated by X2 in FIG. 12, representing the flow in the second zone Z2. The cooled air flows, cooled in the cooling system (the evaporator), and by means of the circulation fans 532A,532B out in the holding arrangement 103, under the holding elements 106A,106B, up between the outer sides of the holder elements 106A,106B and the outer walls of the holding arrangement 103, in under the pans 104,104 in the holder elements, towards the inner, back sides of the pans, up between the pan back walls and the back walls of the holder elements, thus circulating in a reverse flow.

Figure 13:
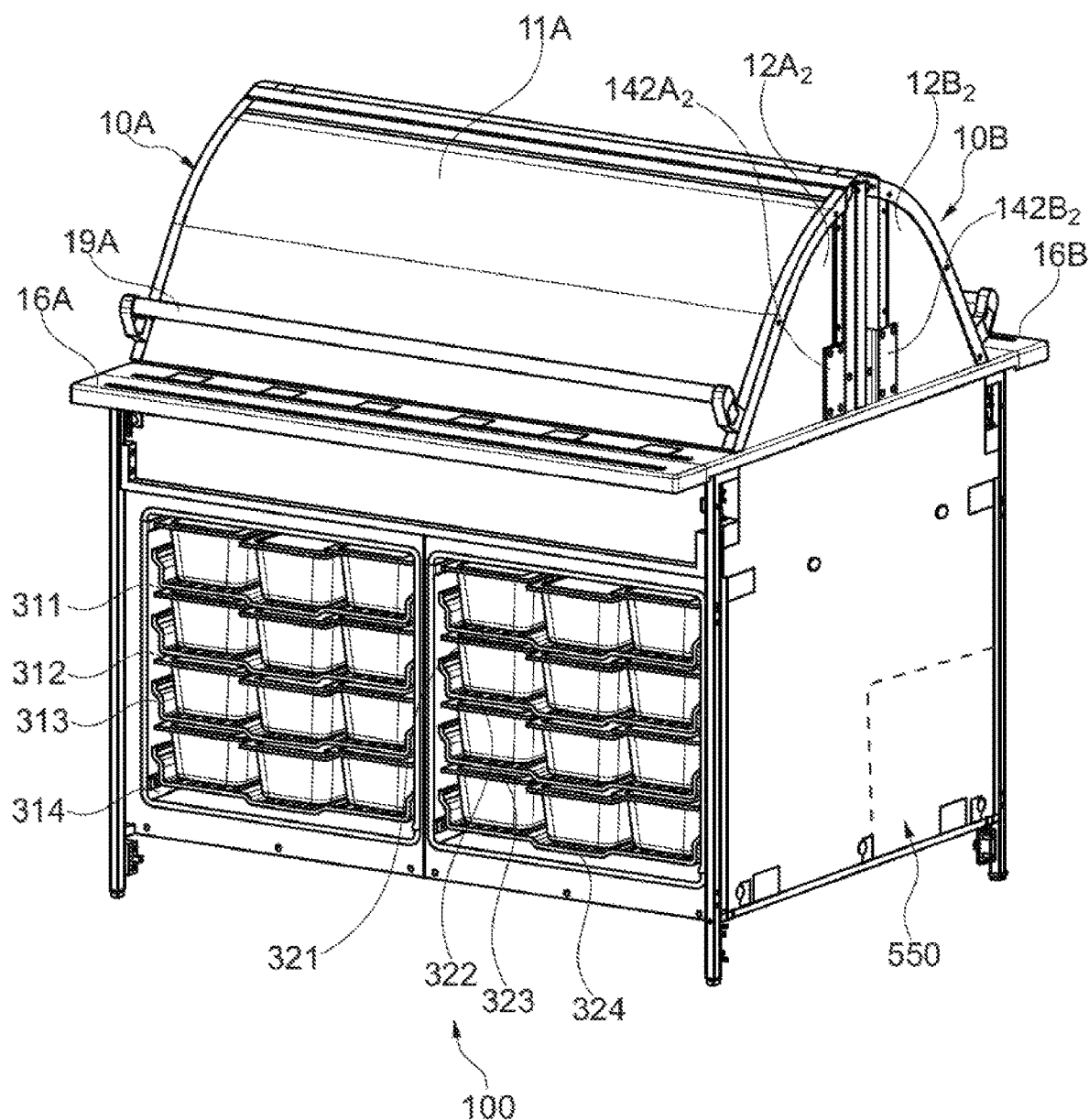
FIG. 13 is a schematic illustration of a covering arrangement of a food bar arrangement also illustrating a third climate zone comprising a refrigerator of the exemplary food bar arrangement of FIG. 9.

FIG. 13 schematically illustrates a food bar arrangement 100 with the third zone Z3, here comprising refrigerators (front doors removed for reasons of clarity) with a plurality of shelves 311,312,313,314 and 321,322,323,324 arranged in two sections, disposed side by side, with the covering elements in closed positions, also illustrating the tray slides 16A,16B. The cabinet might be divided into a refrigerator and a thawing zone Z4, only comprise refrigerators, there being no fourth zone, or only thawing spaces. A fourth zone comprising a thawing space may be provided above the refrigerating arrangement 550.

Figure 14:
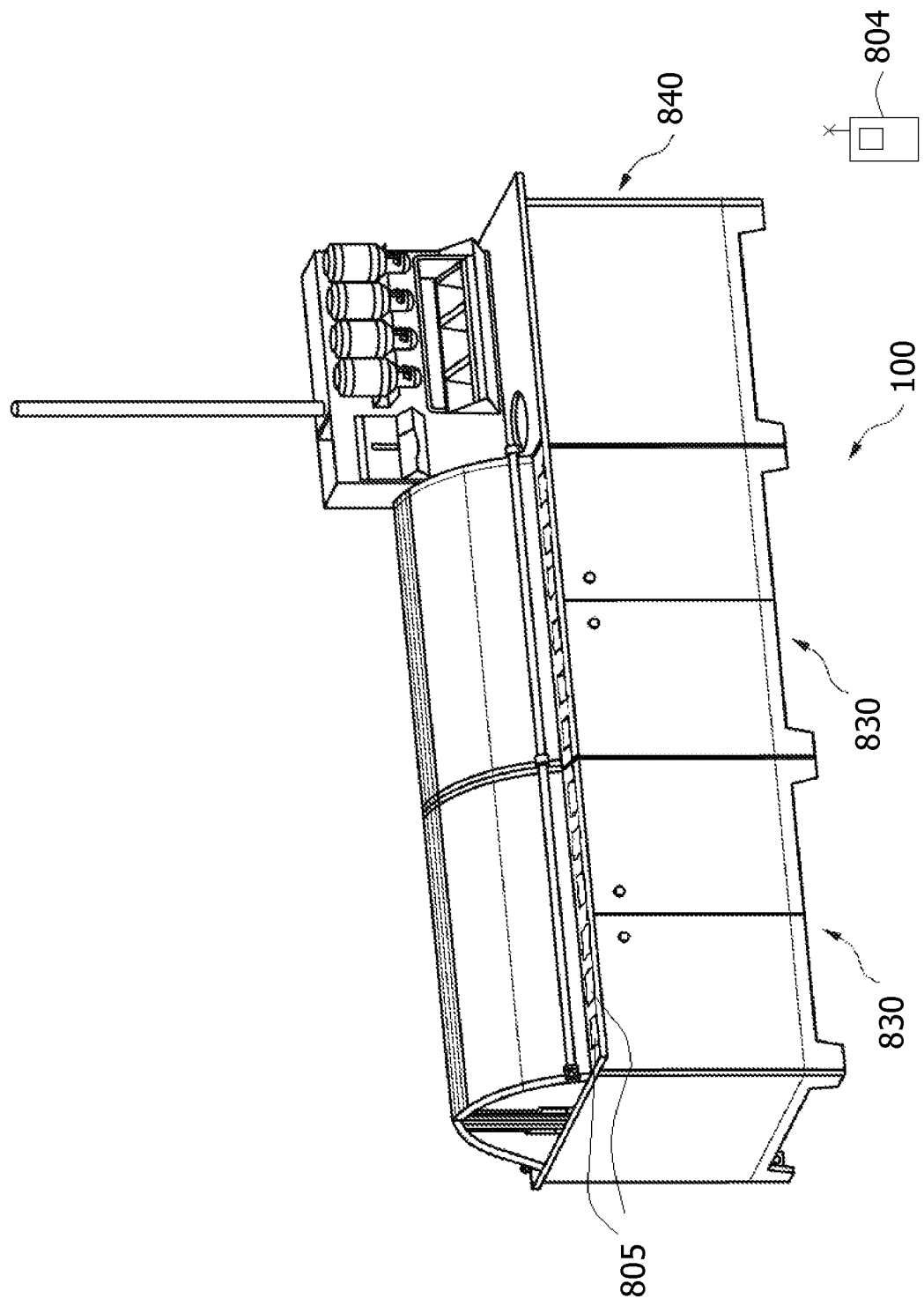
FIG. 14 is a very schematic illustration of an exemplary food bar arrangement with a monitoring and controlling system according to the invention.

FIG. 14 schematically illustrates a food bar arrangement 100 comprising an accessory unit 840 and two FCUs or cooling units/modules, each with two, three or four different and separately controllable climate zones, and each preferably comprising one single evaporator. Of course a food bar arrangement or assembly may comprise more or FCUs or cooling units/modules, which may be dual sided or not, and comprise two or more different climate zones. The accessory unit 840 may be provided separately or also comprise a service station for accessories, bowels or packages for food products, cutlery, towels, ketchup, mustard, dressings, spices etc.

It is a particular advantage of the invention that remote handling, monitoring and control of a food bar arrangement is enabled, preferably both by means of the portable unit, and the service provider, and preferably both as far as products, product related information, and as far as food bar related issues such as temperatures, alarms, fans etc. are concerned.

It should be clear that the invention is not limited to the specifically illustrated embodiments, but that it can be varied in a number of ways within the scope of the appended claims, and implemented with, or comprise, different types of food bar arrangements.

The invention claimed is:

1. A monitoring and controlling system for monitoring and controlling a plurality of food bar arrangements located in different stores, each food bar arrangement having a plurality of functional product stations for holding food products at a plurality of different product holding locations in the food bar and for serving the food products to consumers, comprising:

a station serving unit, wherein the station serving unit communicates with the functional product stations of a food bar arrangement over a local network;

a station serving unit server associated with the station serving unit, the station serving unit server being adapted to communicate with a central database server of a service provider over an internet based on customized or specially adapted Application Programming Interfaces (APIs), the central database server providing the station serving unit with at least product information and client information and communicating eventual food alarms;

a digital display provided for each of the product holding locations for each functional product station, each digital display being located such that each digital display unambiguously is associated with a product or a product holder, comprising a pan or a canteen at the respective product holding location; and a portable unit that communicates with the station serving unit over a wireless local network, the portable unit comprising a display and a scanner for scanning product label codes provided on product holders or products, the product codes comprising information relating to the product including the products' service life or shelf life, and an interactive user interface enabling handling, controlling, and monitoring at least the products; wherein the station serving unit server holds information about the products in the functional product holding stations and about the locations in the functional product holding stations at which the products are held; the information is updated through at least one of scanned product label codes and instructions received from the portable unit and through information about operation states of the functional product holding stations; the station serving unit server provides the central database server with at least current product-related status information received from the station serving unit and alarm information substantially in real time; and the portable unit receives and holds at least part of the information held in the station serving unit.

2. The monitoring and controlling system of claim 1, wherein the portable unit comprises a touch screen.

3. The monitoring and controlling system of claim 1, further comprising a wireless router for external Internet connection and internal connection with the portable unit, the wireless router being arranged in the station serving unit.

4. The monitoring and controlling system of claim 1, wherein the digital displays comprise digital labels.

5. The monitoring and controlling system of claim 1, wherein the product label codes have information about at least one of respective product supplier, product identification, product batch number, shelf life or remaining shelf life, best-before date, and product label number.

6. The monitoring and controlling system of claim 3, further comprising a product display in communication with the station serving unit server through the router, the product display being arranged at the station serving unit for up-to-date information relating to selected products, the up-to-date information including at least about one of ingredients, nutrition value, allergens, and current location or position in a product holding station.

7. The monitoring and controlling system of claim 6, wherein the product display has an interactive screen that displays a plurality of different menus; the product display displays recipe options, such that if a product is selected, a number of recipes are displayed to the user; and through communication between the product display and the station serving unit server, the product display displays labels of products used in a selected recipe.

8. The monitoring and controlling system of claim 1, wherein the station serving unit receives planograms from the central database server.

9. The monitoring and controlling system of claim 1, wherein the station serving unit server communicates with control units of the functional product holding stations; the station serving unit server receives information concerning operation of the functional product holding stations from the control units; and the station serving unit server provides information received from the functional product holding stations.

10. The monitoring and controlling system of claim 1, further comprising an advertising display associated with the station serving unit that shows information and advertising.

11. The monitoring and controlling system of claim 1, wherein the station serving unit server communicates with respective control units of the functional product holding stations over the local network; and the functional product holding stations continuously or at predetermined time intervals provide operational status information to the station serving unit server; and the station serving unit server communicates information on change of operational status to the digital display.

12. The monitoring and controlling system of claim 1, wherein the portable unit selectively displays positions or locations of a selected functional product holding station and current data about products and current positions thereof.

13. The monitoring and controlling system of claim 1, wherein the portable unit displays a menu from which a position or location can be selected by clicking on a layout showing all positions or locations of a product holding station; when a position or location is selected, the portable display unit shows information and current status of a product currently located at the selected position.

14. The monitoring and controlling system of claim 1, wherein the station serving unit is disposed in a service station of a food bar that holds food bar accessories; the digital displays are disposed on tray slides of the food bar; and for each of a number of canteen or pan positions provided in a number of product holding stations of the food bar, each the product holding station includes a cooling unit or module.

15. A food bar arrangement comprising:
a plurality of functional product stations for holding food products at a plurality of different product holding locations in the food bar and for serving the food products to consumers; and
a monitoring and controlling system comprising;
a central database server of a service provider;
a station serving unit that communicates with the functional product station of over a local network;
a station serving unit server associated with the station serving unit, the station serving unit server communicates with the central database server over an internet based on customized or specially adapted Application Programming Interfaces (APIs), the central database server providing the station serving unit with at least product information and client information and communicating food alarms;
a digital display provided for each of the product holding locations, each digital display is associated with a product or a product holder at the respective product holding location; and
a portable unit that communicates with the station serving unit over a wireless local network, the portable unit comprising a display and a scanner for scanning product label codes provided on product holders or products, the product codes comprising information relating to the product including the products' service life or shelf life, and an interactive user interface enabling handling, controlling, and monitoring at least the products, wherein the station serving unit server holds information about the products in the functional product holding stations and about the locations in the functional product holding stations at which the products are held, the information is updated through at least one of scanned product label codes and instructions received from the portable unit and through information about operation states of the functional product holding stations, the station serving unit server provides the central database server with at least current product-related status information received from the station serving unit and alarm information substantially in real time, and the portable unit receives and holds at least part of the information held in the station serving unit.

16. The food bar of claim 15, further comprising a holding apparatus that receives a plurality of product holders, the product holders comprising pans of food products, a cooling system that cools one or more of the pans, wherein the holding apparatus is arranged in association with a product holding station, the cooling system provides at least two different climate zones, and the cooling system provides separate control of the cooling of the at least two climate zones, which include a first climate zone and a second climate zone.

17. The food bar of claim 16, further comprising a controller that controls cooling of the different climate zones, wherein each climate zone comprises at least one zone temperature sensor that for measures a temperature in the respective climate zone, each zone temperature sensor communicates with the control unit, thereby enabling the controller to control cooling of the respective climate zone depending on sensed temperature.

18. The food bar of claim 17, further comprising a covering apparatus with at least one covering element configured to change between a closed position, in which pans are covered and air circulates above the pans, and an open position, in which pans are uncovered, and a motion or position detector that registers a position or movement of the at least one covering element, wherein the controller is responsive to the motion or position detector.

19. The food bar of claim 17, wherein the second climate zone has at least one controllable zone circulation fan for controlling cooling in the second climate zone.

20. The food bar of claim 17, wherein the controller separately controls speeds of fans of the at least two different climate zones based on sensed temperatures in the respective zones.

21. A system for monitoring and controlling a plurality of food bar arrangements in different locations comprising:
a plurality of the food bar arrangements at different locations;
each food bar arrangement comprising a plurality of functional product stations for holding food products at a plurality of different product holding locations in the food bar and for serving the food products to consumers; and a monitoring and controlling system for monitoring and controlling the plurality of food bar arrangements comprising:
  a central database server of a service provider;
  a station serving unit associated with each of the plurality of food bar arrangements, wherein each station serving unit communicates with the functional product stations of the associated food bar arrangement over a local network;
  a station serving unit server associated with each of the station serving units, the station serving unit servers communicate with the central database server over an internet based on customized or specially adapted Application Programming Interfaces (APIs), the central database server providing the station serving unit with at least product information and client information and communicating food alarms;
  a digital display provided for each of the product holding locations for each functional product station, each digital is associated with a product or a product holder at the respective product holding location; and
  a portable unit associated with at least one food bar arrangement, the portable unit communicates with the station serving unit over a wireless local network, the portable unit comprising a display and a scanner for scanning product label codes provided on product holders or products, the product codes comprising information relating to the product including the products' service life or shelf life, and an interactive user interface enabling handling, controlling, and monitoring at least the products, wherein the station serving unit server holds information about the products in the functional product holding stations and about the locations in the functional product holding stations at which the products are held, the information is updated through at least one of scanned product label codes and instructions received from the portable unit and through information about operation states of the functional product holding stations, the station serving unit server provides the central database server with at least current product-related status information received from the station serving unit and alarm information substantially in real time, and the portable unit receives and holds at least part of the information held in the station serving unit.

* * * * *